(12) United States Patent
Hui et al.

(10) Patent No.: US 10,255,775 B2
(45) Date of Patent: Apr. 9, 2019

(54) INTELLIGENT MOTION DETECTION

(71) Applicant: BITwave Pte Ltd, Singapore (SG)

(72) Inventors: Siew Kok Hui, Singapore (SG); Eng Sui Tan, Singapore (SG); Man Tuck Pang, Singapore (SG)

(73) Assignee: BITWAVE PTE LTD., Singapore (SG)

( * ) Notice: Subject to any disclaimer, the term of this patent is extended or adjusted under 35 U.S.C. 154(b) by 0 days.

(21) Appl. No.: 15/683,727

(22) Filed: Aug. 22, 2017

(65) Prior Publication Data
US 2018/0315280 A1 Nov. 1, 2018

Related U.S. Application Data

(60) Provisional application No. 62/491,176, filed on Apr. 27, 2017.

(51) Int. Cl.
| | | |
|---|---|---|
| *G08B 13/196* | (2006.01) | |
| *G08B 25/10* | (2006.01) | |
| *H04N 7/18* | (2006.01) | |
| *H04N 5/232* | (2006.01) | |

(52) U.S. Cl.
CPC ....... *G08B 13/19602* (2013.01); *G08B 25/10* (2013.01); *H04N 5/23206* (2013.01); *H04N 7/181* (2013.01)

(58) Field of Classification Search
CPC .............. G08B 13/19602; G08B 25/10; H04N 5/23206; H04N 7/181
USPC .................................................... 340/539.11
See application file for complete search history.

(56) References Cited

U.S. PATENT DOCUMENTS

| | | | | |
|---|---|---|---|---|
| 9,280,889 | B2* | 3/2016 | Williamson | G08B 25/009 |
| 2006/0195716 | A1* | 8/2006 | Bittner | G08B 13/19656 |
| | | | | 714/6.11 |
| 2006/0271695 | A1* | 11/2006 | Lavian | G06F 21/552 |
| | | | | 709/229 |
| 2011/0047597 | A1* | 2/2011 | Mahaffey | G06F 21/564 |
| | | | | 726/3 |
| 2014/0232861 | A1* | 8/2014 | Naidoo | H04N 7/18 |
| | | | | 348/143 |
| 2014/0309806 | A1* | 10/2014 | Ricci | B60Q 1/00 |
| | | | | 701/1 |
| 2016/0019763 | A1* | 1/2016 | Raji | G06F 1/263 |
| | | | | 340/506 |
| 2016/0142758 | A1* | 5/2016 | Karp | H04W 4/80 |
| | | | | 725/25 |
| 2017/0041524 | A1* | 2/2017 | Schoenen | H04N 5/23206 |
| 2017/0206772 | A1* | 7/2017 | Klimanis | H04W 76/14 |

(Continued)

*Primary Examiner* — Hirdepal Singh
(74) *Attorney, Agent, or Firm* — Amin, Turocy & Watson, LLP

(57) ABSTRACT

Motion or event detection and notification devices and methods are disclosed. Motion or event detection information can be processed and interfaced with in order to facilitate system functionality. In an embodiment, a unique ID can be utilized to identify a recipient of an alert. Unique IDs can correspond to different users or devices of a motion or event detection system. In some embodiments, information relating to the detection can be relayed to a user of the system. That information can take on different forms, including basic information such as a simple notification or other forms such as a live feed of the event. The ability to implement such a system can allow for increased security for an area or increased peace-of-mind for a user or monitor of the system.

20 Claims, 16 Drawing Sheets

(56) References Cited

U.S. PATENT DOCUMENTS

| | | | |
|---|---|---|---|
| 2017/0257733 A1* | 9/2017 | Arneson | H04W 4/80 |
| 2017/0294090 A1* | 10/2017 | Sentosa | G08B 13/19619 |
| 2017/0301220 A1* | 10/2017 | Jarrell | H04W 4/70 |
| 2017/0325056 A1* | 11/2017 | Mehta | H04W 4/90 |
| 2017/0352236 A1* | 12/2017 | Moses | H04N 7/147 |
| 2018/0182214 A1* | 6/2018 | Qi | G08B 13/19656 |

\* cited by examiner

INTELLIGENT MOTION DETECTION

CROSS REFERENCE TO RELATED APPLICATION

The subject patent application claims priority to U.S. Provisional Patent Appln. No. 62/491,176, filed Apr. 27, 2017, and entitled "A Smartphone APP for Intelligent data collection and transmission based on remote motion sensing." The entirety of the aforementioned application is hereby incorporated by reference herein.

TECHNICAL FIELD

The disclosed subject matter relates to intelligent motion or event detection systems and mobile applications, for example, applications for managing a remote sensor network and installed on a mobile device such as a smartphone.

BACKGROUND

By way of brief background, residences, workplaces and spaces are areas where security is desired by many. Motion detection is an excellent method for detecting intruders, because movement is a requirement for entry into a space. In the case of an intruder, a notification to an owner/manager of the area can be conveyed and an alarm can be triggered, increasing the safety of the occupants of the area. Motion detection is useful for detecting non-intruders as well, such as for notifying a parent when a child has arrived home. Other types of sensors included in such a system can supplement motion detection or can even operate without a motion detection sensor.

Conventionally, monitoring systems require a professional installation and external management, typically a paid service. Security companies can be expensive with respect to both initial costs and ongoing management fees. Alternatively, for the more-modern user-managed systems, a $3^{rd}$ party wireless network, such as Wi-Fi, is typically required to facilitate communication between components. The requirement for additional components such as a wireless router can add cost and potentially compromise security. Disruption of internet connectivity can render these systems useless or at least reduce their functionality since internet connectivity is often a requirement for operation. Further, these systems often do not allow for a robust network of monitoring devices of which can receive notifications of the intrusion or other type of event. For those that do offer a network of monitoring devices, selective notification of the devices is not always an option. Where security or event monitoring systems can be improved and with fewer impediments than conventional techniques/technology, safety and peace-of-mind can be improved and potentially, lives can be saved.

SUMMARY

The following presents a simplified summary of the specification in order to provide a basic understanding of some aspects of the specification. This summary is not an extensive overview of the specification. It is intended to neither identify key or crucial elements of the specification nor delineate the scope of any particular implementations of the specification, or any scope of the claims. Its purpose is to present some concepts of the specification in a simplified form as a prelude to the more detailed description that is presented in this disclosure.

One or more embodiments disclosed herein relate to motion or event detection and the related commutations and systems thereof. The system can contain at least one component with an electronic processor. The system can gather information from nodes comprising sensors and process the information for delivery to a user of the system. The system can comprise, but is not limited to, one or more of a node device, a hub device, a server and a mobile device.

In one embodiment, a method comprises receiving, by a smartphone application of a mobile device comprising a processor from a hub device communicatively coupled to a motion sensor device, information indicative of a detection of a presence of a moving object. In response to the receiving the information and based on a condition being determined to be satisfied, generating, by the smartphone application, a first signal to be sent to a control server, wherein the first signal comprises the information indicative of the detection of the presence of the moving object. The method can further comprise, in response to the first signal being sent to the control server, receiving, by the smartphone application, a second signal comprising a confirmation that the first signal was received by the control server. The first signal being sent to the control server enables the control server to further send an event message, based on the first signal, to a group of smartphone applications registered with the control server as authorized to receive the event message. The group of smartphone applications can comprise the smartphone application. In addition, the method can further comprise, in response to the receiving the second signal, generating, by the smartphone application, a notification of the detection via different modalities at the mobile device.

The method can further comprise, after the receiving the information by the smartphone application from the hub device, and based on the condition being determined not to have been satisfied, rejecting, by the smartphone application, the information and not performing the generating of the first signal.

The generating the notification of the detection via the different modalities can comprise generating the notification when a defined time period elapses without having received, by the smartphone application, a response from the control server. Alternatively, the generating the notification of the detection via the different modalities can comprise generating audible information at the mobile device. The generating the notification of the detection via the different modalities can also comprise generating visual information at the mobile device. As another option, the generating the notification of the detection via the different modalities can comprise generating a third signal comprising the event message to be sent to other devices communicatively coupled to the mobile device.

The receiving of the information can comprise receiving the information via a peer to peer communication protocol that directly connects the smartphone application of the mobile device to the hub device without connecting to any intermediary device and the peer to peer communication protocol can be further used to facilitate communication of at least one of the first signal or the second signal.

In another non-limiting embodiment, a control server can comprise a processor, and a memory that stores executable instructions that, when executed by the processor, facilitate performance of operations. The operations can comprise receiving, from an application installation of an application executing on a mobile device communicatively coupled to a hub device, a first signal indicative of a detection of a presence of a moving object, and, in response to the receiving, comparing a unique identification (ID) associated with the application with unique IDs associated with application installations stored in a memory accessible to the control server. The operations can further comprise, based on a result of the comparing, generating a group of the unique IDs that are associated with registered application installations that have registered to use the application. The operations can further comprise, in response to the generating, sending a second signal indicative of the detection of the presence of the moving object to devices associated with the registered application installations having the group of the unique IDs.

The devices associated with the registered application installations can comprise the mobile device with the application installation.

In one embodiment, the devices associated with the registered application installations do not comprise the mobile device with the application installation.

The unique IDs can comprise a first unique ID of a first application installation installed on a first device of a first type and a second unique ID of a second application installation on a second device of a second type different from the first type.

The first device can be an Internet of things device, and the second device can be a portable computing device connected to a wireless network.

The operations can further comprise receiving, from the mobile device with the application installation, the unique IDs associated with the application installations, and, in response to the receiving, storing the unique IDs associated with the application installations.

In yet another non-limiting embodiment, a machine-readable storage medium comprises executable instructions that, when executed by a processor of a hub device, facilitate performance of operations. The operations can comprise receiving, from a motion detector of a group of motion detectors, a first signal indicative of a detection of a presence of a moving object, and, in response to the receiving, generating a second signal indicative of the detection of the presence of the moving object. The operations can further comprise, in response to the generating, sending the second signal to an application of a mobile device, wherein a routing device is not used to facilitate communication of the first signal or the second signal.

The sending of the second signal can comprise sending the second signal according to at least one of a direct routing protocol or a peer to peer communication protocol. The hub device can be adapted to be physically coupled to the mobile device. The second signal can comprise status information of at least one of the hub device or the motion detector.

The receiving of the first signal can comprise receiving the first signal directly from the motion detector according to at least one of a Bluetooth™ protocol, a near field communication protocol, or a Wi-Fi direct protocol that does not involve indirect communications via a routing device.

The motion detector may be within a defined proximity to the hub device specified by a wireless protocol connecting the motion detector to the hub device.

The mobile device may be within a defined proximity to the hub device specified by a wireless protocol connecting the motion detector to the hub device.

In another embodiment, multiple mobile devices can be utilized in order for information to be delivered to multiple users.

In another embodiment, peripheral devices can be connected to the system and perform their own processing of the information.

In another embodiment, the system can contact a law enforcement agency to aid in addressing the cause of event detection.

In another embodiment, the system can facilitate communication with devices not possessing a system application (APP).

The following description and the drawings set forth certain illustrative aspects of the specification. These aspects are indicative, however, of but a few of the various ways in which the principles of the specification may be employed. Other advantages and novel features of the specification will become apparent from the following details description of the specification when considered in conjunction with the drawings.

BRIEF DESCRIPTION OF DRAWINGS

Numerous aspects, implementations and advantages of the present invention will be apparent upon consideration of the following detailed description, taken in conjunction with the accompanying drawings, in which like reference characters refer to the like parts throughout, and in which.

DETAILED DESCRIPTION

Figure 1:
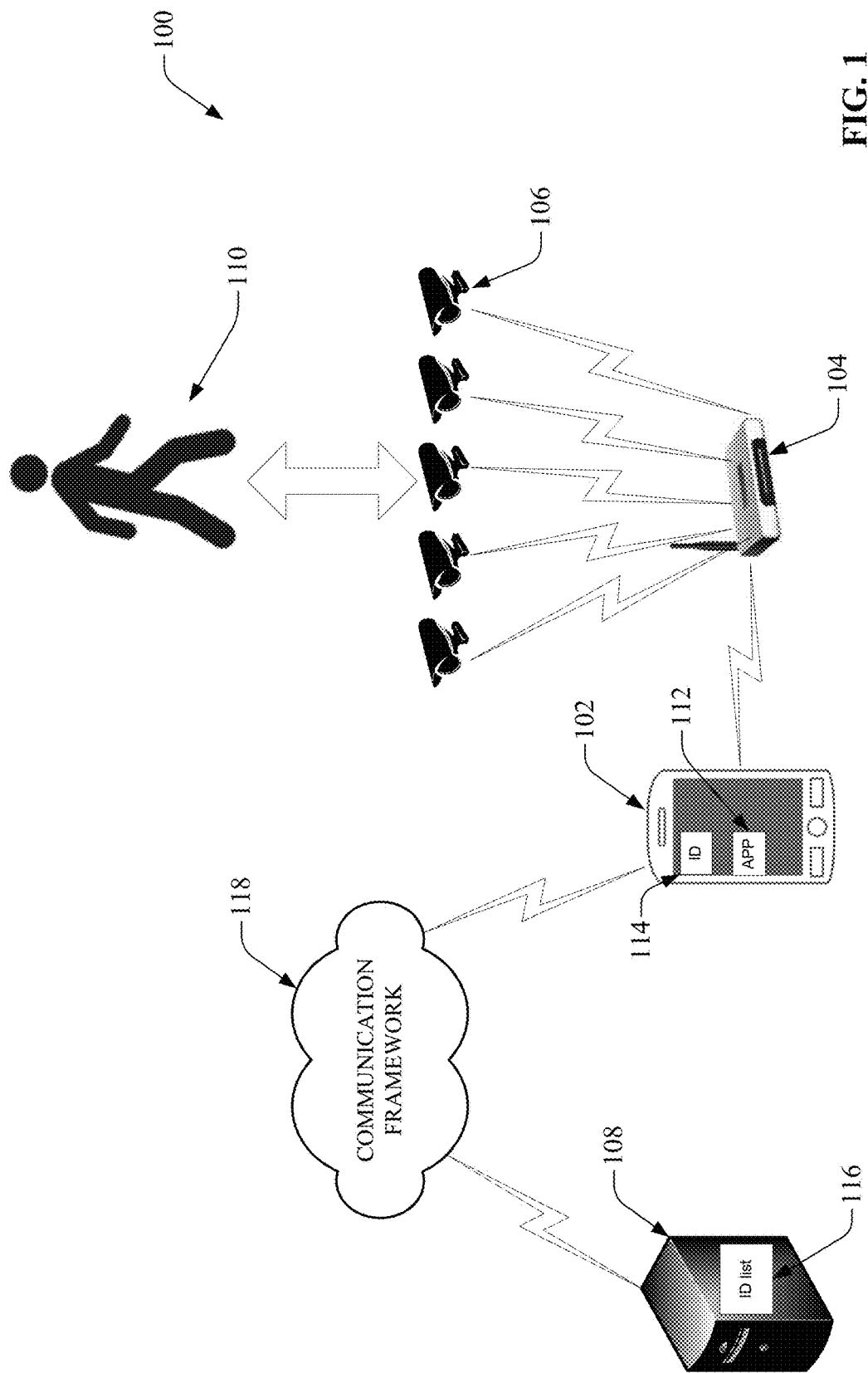
FIG. 1 illustrates a high-level functional diagram of an example motion detection system comprising a mobile device with an APP, server, hub device and nodes in accordance with various aspects disclosed herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Over 2 million burglaries occur in the United States every year, amounting to $14.3 billion in financial losses according to the U.S. Department of Justice. The emotional trauma of a break-in can be detrimental. Law enforcement agencies do not have the financial abilities and personnel required to end such problems alone.

Thus, individuals would like to be able to monitor activity in a home, business or other area, such as an outdoor location. For example, a mother may want to know if her child has arrived home from school while she is away from her home, or if the air is in a hospitable condition.

Systems and methods disclosed herein relate to motion or event detection and the related commutations. The system is referred to as a "motion detection system" or alternatively as "system" but the motion detection system is not limited to detecting motion. At least one embodiment of the motion detection system includes motion detection; however, the motion detection system can detect different types of inputs or events and can even not include motion as one or the inputs or events. The system can include an electronic processor in at least one device of the system. In one embodiment, the system gathers information from a node unit (node) and processes the information for delivery to a user of the system by delivering information to a mobile device of a user of the system. The node units can be at least one of many types, and each individual sensor can capture information via different mediums. The nodes can include, but are not limited to: a location sensor, inertial sensor, optical sensor, audio sensor, distance sensor, water sensor or temperature sensor. A node can comprise at least one sensor, and can include multiple sensors at one single node unit.

In an embodiment, a node unit can detect an intruder of an area of deployment. Information of the detection can be relayed to a hub device (hub) associated with the node. Multiple hub devices can exist, and a node is not limited to association with only one hub device. The node is not limited to detecting intruders, and can detect other conditions as well. The information can be relayed to the hub device. The other conditions can include, but are not limited to: any kind of motion, children, pets, fire, smoke, water, carbon monoxide, residents, guests or deliveries among others. The hub device can relay information to a mobile device with a system application (APP) installed. The APP can relay, with or without user input, depending on settings or hardware configurations, information to a control server (server) associated with the system. The control server can perform different tasks. One task, for example, can include identifying recipients for a notification. The server can relay the information to the recipients.

For example, a node unit can relay information directly to a mobile device with a system application installed. The information can include, but is not limited to information of a detection of: any kind of motion, children, pets, fire, smoke, water, carbon monoxide, residents, guests or deliveries among others. The APP of the mobile device can relay, with or without user input, depending on settings or hardware configurations, information to a control server associated with the system. For example, the control server can identify recipients for a notification. The server can then relay the message to those recipients.

In another example, a node can relay information directly to a server associated with the node. The information can include, but is not limited to information of a detection of: any kind of motion, children, pets, fire, smoke, water, carbon monoxide, residents, guests or deliveries among others. The server can identify recipients for a notification. The server can then relay the message to those recipients.

In another embodiment, a hub device can be physically coupled to a mobile device. It could be in the fashion of a case or attached otherwise. The physical coupling can facilitate an electrical coupling, but it does not necessarily do so. The electrical coupling can facilitate the transfer of electricity or information. The electrical coupling can do so via direct contact or other method of transmission, such as induction.

In another embodiment, a hub device can be a stand-alone device, not physically coupled to any other device of the motion detection system. The hub can communicate with other devices of the motion detection system without a physical coupling.

In another embodiment, a motion detection system can display node information to a user via an APP. For example, the information could be a optical or audio information and be displayed live or from a recording stored in memory. Information can include a verbal description of an area of deployment of a node for which motion or a condition was detected.

In another embodiment, a motion detection system can comprise multiple mobile devices. At least one mobile device can exist as a primary mobile device, but the system is not limited to one primary mobile device. A primary mobile device can authorize access for other mobile devices. The system can comprise any combination of mobile devices and primary mobile devices. The other devices can have limited access or possess the same access and functionality as the primary mobile device. Such permission levels can be pre-set or can be set by the primary mobile device.

In another embodiment, multiple servers can be deployed. These servers can be proximal or located any distance apart. They can operate as one collective system or can operate as separate server systems.

In another embodiment, peripheral devices can be associated with the motion detection system. Peripheral devices can include, but are not limited to a car, microphone, smartphone, headphones, computer, other mobile device, traditional security system, security system, speaker, boat, plane or drone among others. A peripheral device can be any device communicatively coupled to the motion detection system that can receive a signal. The peripheral device (peripheral) can use its own inherent functionality to facilitate interfacing with the signal and output a signal, alert, notification or other of the signal received. A signal can be received by the control server, mobile device, hub device or any other component of the motion detection system.

In another embodiment, a law enforcement agency can be a recipient of a signal from the motion detection system. The signal can be sent via a text message, phone call, email, radio, or other method. The law enforcement agency can be a local law enforcement agency, such as local police, or a different law enforcement agency. The agency can be predetermined or chosen by the user.

Referring now to FIG. 1, there is illustrated a non-limiting exemplary implantation of a motion detection system 100 in accordance with various aspects of this disclosure. The motion detection system 100 can include communicatively connected components. For example, a mobile device 102 comprising an installation of an application (APP) 112 and comprising a unique ID 114, a hub device 104, a node 106, a control server 108 comprising unique ID list 116, or communication framework 118 can be included.

The mobile device 102 can perform functions relating to the motion detection system 100. For example, mobile device 102 can communicate with a hub device 104, with a control server 108 or with node unit 106. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Mobile device 102 can be a primary mobile device or a mobile device authorized by a primary mobile device to interact with the motion detection system 100. Mobile device 102 can possess an installation of APP 112. The installation of APP 112 can possess a unique identification (ID) 114 representing a specific installation on the mobile device 102.

The hub device 104 can perform one or more functions relating to the motion detection system 100. For example, the hub device 104 can communicate with the mobile device 102, with node unit 106 or with control server 108. Communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Hub device 104 can be communicatively coupled to a device or can be physically coupled to mobile device 102. The physical coupling could be in the form of a case or attached otherwise. The physical coupling can facilitate an electrical coupling. If present, the electrical coupling can facilitate the transfer of electricity or information. The electrical coupling can do so via direct contact or other method of transmission, such as induction.

Node unit 106 can perform one or more functions relating to the motion detection system 100. One or more node units 106 can exist in motion detection system 100 and there is no limitation on the quantity of node unit 106. Node unit 106 can include one or more sensors, but is not limited to: a location sensor, inertial sensor, optical sensor, audio sensor, distance sensor, water sensor or temperature sensor. These sensors can detect one or more conditions including, but not limited to, any kind of motion, children, pets, fire, smoke, water, carbon monoxide, residents, guests or deliveries among others. Node unit 106 can be battery operated or wall-powered. It can be a fixed device or readily movable. Node unit 106 can communicate via IR, shortwave transmission, NFC, Bluetooth, Wi-Fi, LTE, GSM, CDMA, satellite, visual cues or radio waves among others. Node unit 106 can detect motion of entity 110, however, node unit 106 is not limited to the detection of motion, and motion is only one method of many possible methods of detection of the motion detection system 100.

Control server 108 can perform one or more functions relating to the motion detection system 100. One or more control servers 108 can exist as motion detection system 100 is not confined to one control server as illustrated in FIG. 1. Control server 108 can store unique ID 114 associated with an installation or user of the motion detection system 100. Control server 108 can be communicatively coupled to mobile device 102, hub device 104 or node unit 106, and is not limited to only connecting with mobile device 102 as illustrated in FIG. 1. Control server 108 can compare a unique ID 114 with a list of unique IDs 116 registered with the control server. By doing so, the control server 108 can generate a list of recipients of a signal in response to a signal being received by mobile device 102 with unique ID 114. The unique IDs 116 stored in memory of the control server can be registered by mobile device 102 possessing APP 112. The unique IDs 116 can be added by other devices or directly at the control server 108. The control server 108 can be proximal to other devices of the motion detection system 100 or can be located in a different location. Control server 108 is not limited to the composition of a server. Control server 108 can be in the form of a variety of devices having server functionality, such as a computer, mobile device or other. Control server 108 can also store in memory information received at node unit 106. Control server 108 can facilitate live viewing of the information received by node unit 106 wherein a user can view the information received by node unit 106 from anywhere communication can be achieved.

Entity 110 can be anything detected by motion detection system 100. Entity 110 is not a component of the motion detection system 100, but rather an entity that can be detected by the motion detection system 100. While entity 110 is depicted as a walking person in FIG. 1, entity 110 can be anything detectable by at least one sensor of a node unit 106. Entity can be, but is not limited to, any kind of motion, children, pets, fire, smoke, water, carbon monoxide, residents, guests or deliveries among others. One or more entities 110 can exist and can be individually or concurrently detected by motion detection system 100.

APP 112 can perform different functions relating to the motion detection system 100. APP 112 can be installed on mobile device 102. The installation can possess a unique ID 114. APP 112 can process inputs and outputs for motion detection system 100.

APP 112 can be a registration point for registering other devices to be authorized to connect and interact with motion detection system 100. APP 112 can also remove registration of devices of motion detection system 100. APP 112 can make entries to the list of unique IDs 116 stored in control server 108 and can likewise remove entries from the unique IDs 116. APP 112 can display the status of devices of the motion detection system 100 and perform diagnostics on the devices.

APP 112 can display information received at node unit 106. APP 112 can control different types or features of node unit 106. For example, in the case that node unit 106 is a camera that can change orientation, APP 112 can control the movement. Other examples of node 106 control can include, adjusting a camera, adjusting a microphone, generating output for a speaker, adjusting sensitivity of the node unit 106, resetting node unit 106 or resetting a signal or alert generated by node unit 106 among controlling many other functions.

In an example, APP 112 can control devices of other systems. For example, APP 112 can issue and receive commands or information from communicatively coupled devices. Examples of such devices can include communicatively connected: electrical plugs, thermostats, garage door openers, locks, entertainment systems, computers, televisions or fans among many others.

APP 112 can run in the background on mobile device 102. Running in the background can allow APP 112 to generate notifications to be displayed on mobile device 102, even when APP 112 is not on-screen.

In an example, APP 112 can display its unique ID 114 associated with its installation on mobile device 102.

In another example, APP 112 can display the unique IDs 116 stored on control server 108.

APP 112 can generate notifications to be received in different forms. For example, APP 112 can generate audible information to be broadcast on a speaker of mobile device 102 or other device. The audible information, for example, can indicate the location of entity 110 or the type of detection or sensor that was used to detect entity 110.

In another example, APP 112 can generate a visual message or notification on a screen of mobile device 102 or on a different device. The visual message or notification can include a snapshot image taken by a node unit 106.

APP 112 can facilitate technical support with APP 112 and the motion detection system 100. For example, a user of APP 112 can navigate to a page with FAQ (frequently asked questions), manuals, user guides, communications links, contact information or other methods for assisting a user of motion detection system 100 or APP 112. The technical support can direct a user to contact information of the APP 112 developer, manufacturer of motion detection system 100, retailer of motion detection system 100 or another contact point.

Unique ID 114 can be a number or string of characters associated with installation of APP 112 on a mobile device 102. Unique ID 114 can be generated at the time of installation, following instructions associated with code of APP 112.

In one embodiment, unique ID 114 can be permanent and can be the same number or characters if the APP 112 were, for example, removed and re-installed on the same device.

In another embodiment, unique ID 114 can change every time in installation occurs and can change if the APP 112 were removed and re-installed.

Unique IDs (Unique ID list) 116 can comprise a list of registrations of devices authorized to use or contained within motion detection system 100. Unique IDs 116 can be stored in memory of control server 108. Unique IDs 116 can be stored on other devices of motion detection system 100, for example, on mobile device 102. Unique IDs 116 can be readable by mobile device 102 or other devices.

Communication framework 118 can comprise, but is not limited to: a global communication network such as the Internet that can be employed to facilitate communications devices of motion detection system 100. Communication framework 118 can utilize: IR, shortwave transmission, NFC, Bluetooth, Wi-Fi, LTE, GSM, CDMA, satellite, visual cues or radio waves among others.

In an embodiment, direct communication can be established between mobile device 102 and control server 108.

In another embodiment, communication framework 118 can facilitate communications between other devices of motion detection system 100.

Figure 2:
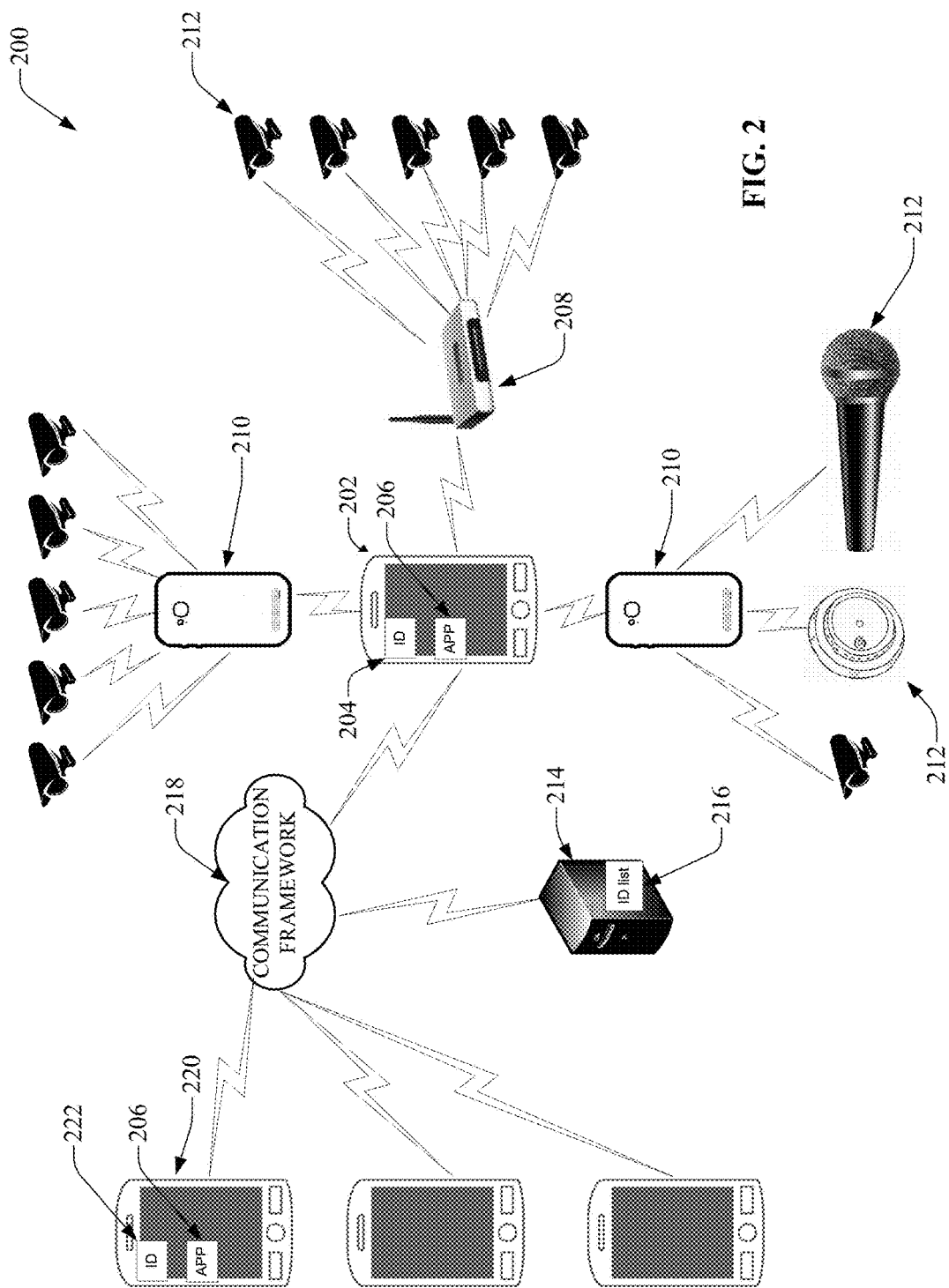
FIG. 2 illustrates a high-level functional diagram of an example motion detection system comprising mobile devices with an APP, server, hub devices and nodes in accordance with various aspects disclosed herein.

Referring now to FIG. 2, there is illustrated a non-limiting exemplary implantation of a motion detection system 200 in accordance with various aspects of this disclosure. The motion detection system 200 can include different communicatively connected components. For example, a mobile device 202 comprising an installation of an application (APP) 206 and comprising a unique ID 204, a hub device 208, a hub device 210, a node 212, a control server 214 comprising unique ID list 216, communication framework 218 or mobile device 220 comprising an installation of an APP 206 and comprising a unique ID 222 can be included.

The mobile device 202 can perform different functions relating to the motion detection system 200. For example, mobile device 202 can communicate with a hub device 208, hub device 210, node unit 212, mobile device 220 or with a control server 214. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Mobile device 202 can possess an installation of APP 206. The installation of APP 206 can possess a unique identification (ID) 204 representing a specific installation on the mobile device 202.

Mobile device 220 can perform different functions relating to the motion detection system 200. In one embodiment, mobile device 220 is an authorized device of motion detection system 200 and communicates with the communication framework 218 to obtain information. The communication can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Mobile device 220 can possess an installation of APP 206. The installation of APP 206 can possess a unique identification (ID) 222 representing a specific installation on the mobile device 220.

The hub device 208 can perform one or more functions relating to the motion detection system 200. For example, the hub device 208 can communicate with the mobile device 202, with node unit 212 or with control server 214. Communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Hub device 208 can be a standalone device and can be wall-powered or battery powered.

The hub device 210 can perform one or more functions relating to the motion detection system 200. For example, the hub device 210 can communicate with the mobile device 202, with node unit 212 or with control server 214. Communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Hub device 210 can be physically coupled to mobile device 202. The physical coupling could be in the form of a case or attached otherwise. The physical coupling can facilitate an electrical coupling. If present, the electrical coupling can facilitate the transfer of electricity or information. The electrical coupling can do so via direct contact or other method of transmission, such as induction.

Node unit 212 can perform one or more functions relating to the motion detection system 200. One or more node units 212 can exist in motion detection system 200 and there is no limitation on the quantity of node unit 212. Node unit 212 can include one or more sensors, but is not limited to: a location sensor, inertial sensor, optical sensor, audio sensor, distance sensor, water sensor or temperature sensor. These sensors can detect different conditions including, but not limited to, any kind of motion, children, pets, fire, smoke, water, carbon monoxide, residents, guests and deliveries among others. Node unit 212 can be battery operated or wall-powered. It can be a fixed device or readily movable. Node unit 212 can communicate via IR, shortwave transmission, NFC, Bluetooth, Wi-Fi, LTE, GSM, CDMA, satellite, visual cues or radio waves among others. Node unit 212 can detect motion of entity 110, but as previously described, node unit 212 is not limited to the detection of motion, and motion is only one method of many methods of detection of the motion detection system 200.

Control server 214 can perform one or more functions relating to the motion detection system 200. One or more control servers 214 can exist as motion detection system 200 is not confined to one control server as illustrated in FIG. 2. Control server 214 can store unique ID 204 or 222 associated with installations or users of the motion detection system 200. Control server 214 can be communicatively coupled to mobile device 202, mobile device 220, hub device 208, hub device 210 or node unit 212. Control server 214 can compare a unique ID 204 or 222 with a list of unique IDs 216 registered with the control server 214. By doing so, the control server 214 can generate a list of recipients of a signal in response to a signal being received by mobile device 202 with unique ID 204. One of those devices includes in the list of unique IDs 216 can include mobile device 220 possessing unique ID 222. The unique IDs 216 stored in memory of the control server 214 can be registered by mobile device 202 possessing APP 206. The unique IDs 216 can be added by other devices or directly at the server 214. The control server 214 can be proximal to other devices of the motion detection system 200 or can be located in a different location. Control server 214 is not limited to the composition of a server. Control server 214 can be in the form of a group of devices having server functionality, such as a computer, mobile device or other. Control server 214 can also store in memory information received at node unit 212. Control server 214 can facilitate live viewing of the information received by node unit 212 wherein a user can view the information received by node unit 212 from anywhere communication can be achieved.

APP 206 can perform different functions relating to the motion detection system 200. APP 206 can be installed on mobile device 202 or mobile device 220, and that installation can possess a unique ID 204 or 222, respectively. APP 206 can process inputs and outputs for motion detection system 200.

APP 206 can be a registration point for registering other devices, such as mobile device 220, to be authorized to connect and interact with motion detection system 200. APP 206 can also remove registration of devices of motion detection system 200. APP 206 can make entries to the list of unique IDs 216 stored in control server 214, such as entries of unique ID 222 of mobile device 220 and can likewise remove entries from the unique IDs 216. APP 206 can display the status of devices of the motion detection system 200 and perform diagnostics on the devices.

APP 206 can display information received at node unit 212. APP 206 can control different types or features of node unit 212. For example, in the case that node unit 212 is a camera that can change orientation, APP 206 can control the movement. Other examples of node 212 control can include, adjusting a camera, adjusting a microphone, generating output for a speaker, adjusting sensitivity of the node unit 212, resetting node unit 212, resetting a signal or resetting alert generated by node unit 212 among controlling many other functions.

In an example, APP 206 can control devices of other systems. For example, APP 206 can issue and receive commands or information from communicatively coupled devices. Examples of such devices can include communicatively connected: electrical plugs, thermostats, garage door openers, locks, entertainment systems, computers, televisions or fans among many others.

APP 206 can run in the background on mobile device 202 or mobile device 220. Running in the background can allow APP 206 to generate notifications to be displayed on mobile device 202 or 220, even when APP 206 is not on screen.

In an example, APP 206 can display its unique ID associated with its installation on mobile device 202 or 220, respectively.

In another example, APP 206 can display the unique IDs 216 stored on control server 214.

APP 206 can generate notifications to be received in different forms. For example, APP 206 can generate audible information to be broadcast on a speaker of mobile device 202 or 220 or other device. The audible information, for example, can indicate the location of entity 110 or the type of detection was used to detect entity 110.

In another example, APP 206 can generate a visual message on the screen of mobile device 202, 220 or on a different device. The visual message or notification can include a snapshot image taken by a node unit 212.

APP 206 can facilitate technical support with APP 206 and the motion detection system 200. For example, a user of APP 206 can navigate to a page with FAQ (frequently asked questions), manuals, user guides, communications links, contact information or other methods for assisting a user of motion detection system 200 or APP 206. The technical support can direct a user to contact information for the APP 206 developer, manufacturer of motion detection system 200, retailer of motion detection system 200 or another contact point.

Unique ID 204 can be a number or string of characters associated with installation of APP 206 on a mobile device 202. Unique ID 204 can be generated at the time of installation, following instructions associated with code of APP 206.

In one embodiment, unique ID 204 can be permanent and can be the same characters if the APP 206 were, for example, removed and re-installed on the same device.

In another embodiment, unique ID 204 can change every time in installation occurs and can change if the APP 206 were removed and re-installed.

Unique ID 222 can be a number or string of characters associated with installation of APP 206 on a mobile device 220. Unique ID 222 can be generated at the time of installation, following instructions associated with the code of APP 206.

In one embodiment, unique ID 222 can be permanent and can be the same number or characters if the APP 206 were, for example, removed and re-installed on the same device.

In another embodiment, unique ID 222 can change every time in installation occurs and can change if the APP 206 were removed and re-installed.

Unique IDs (Unique ID list) 216 can comprise a list of registrations of devices authorized to use or be a part of motion detection system 200. Unique IDs 216 can be stored in memory of control server 214. Unique IDs 216 can be stored on other devices of motion detection system 200, for example, on mobile device 202 or mobile device 220.

Unique IDs 216 can be readable by mobile device 202, mobile device 220 or other devices.

Communication framework 218 can comprise, but is not limited to: a global communication network such as the Internet that can be employed to facilitate communications devices of motion detection system 200. Communication framework 218 can utilize: IR, shortwave transmission, NFC, Bluetooth, Wi-Fi, LTE, GSM, CDMA, satellite, visual cues or radio waves among others.

In an embodiment, direct communication can be established between mobile device 202 or 220 and control server 214.

In another embodiment, communication framework 218 can facilitate communications between other devices of motion detection system 200.

Figure 3:
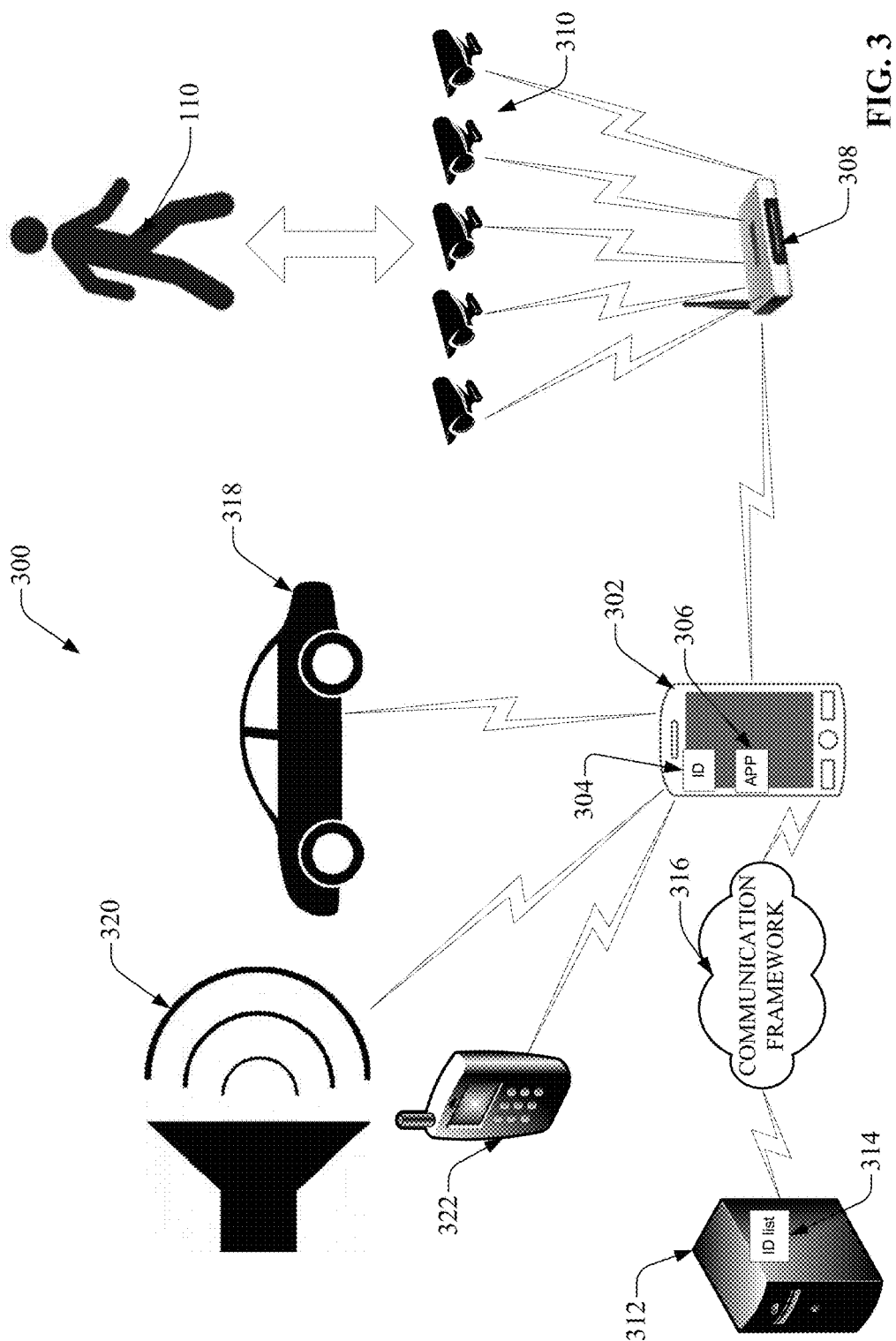
FIG. 3 illustrates a high-level functional diagram of an example motion detection system comprising a mobile device with an APP, server, hub device, nodes and a peripheral device in accordance with various aspects disclosed herein.

Referring now to FIG. 3, there is illustrated a non-limiting exemplary implantation of a motion detection system 300 in accordance with various aspects of this disclosure. The motion detection system 300 can include different communicatively connected components. For example, a mobile device 302 comprising an installation of application (APP) 306 and comprising a unique ID 304, a hub device 308 a node 310, a control server 312, mobile APP 306, communication framework 316, or peripheral 318, 320 or 322.

The mobile device 302 can perform different functions relating to the motion detection system 300. For example, mobile device 302 can communicate with a hub device 308, with node 310, with a control server 312 or a peripheral device 318, 320 or 322. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Mobile device 302 can be a primary mobile device or a mobile device authorized by a primary mobile device to interact with the motion detection system 300. Mobile device 302 can possess an installation of APP 306. The installation of APP 306 can possess a unique identification (ID) 304 representing a specific installation on the mobile device 302.

The hub device 308 can perform one or more functions relating to the motion detection system 300. For example, the hub device 308 can communicate with the mobile device 302, with node 310, with control server 312 or with peripheral 318, 320 or 322. Communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Hub device 308 can be communicatively coupled to device or can be physically coupled to mobile device 302. The physical coupling could be in the form of a case or attached otherwise. The physical coupling can facilitate an electrical coupling. If present, the electrical coupling can facilitate the transfer of electricity or information. The electrical coupling can do so via direct contact or other method of transmission, such as induction.

Node unit 310 can perform one or more functions relating to the motion detection system 300. One or more node units 310 can exist in motion detection system 300 and there is no limitation on the quantity of node unit 310. Node unit 310 can include one or more sensors, but is not limited to: a location sensor, inertial sensor, optical sensor, audio sensor, distance sensor, water sensor or temperature sensor. These sensors can detect one or more conditions including, but not limited to, any kind of motion, children, pets, fire, smoke, water, carbon monoxide, residents, guests or deliveries among others. Node unit 310 can be battery operated or wall-powered. It can be a fixed device or readily movable. Node unit 310 can communicate via IR, shortwave transmission, NFC, Bluetooth, Wi-Fi, LTE, GSM, CDMA, satellite, visual cues or radio waves among others. Node unit 310 can detect motion of entity 110, but as previously described, node unit 310 is not limited to the detection of motion, and motion is only one method of many methods of detection of the motion detection system 300.

Control server 312 can perform one or more functions relating to the motion detection system 300. Different control servers 312 can exist as motion detection system 300 is not confined to one control server as illustrated in FIG. 3. Control server 312 can store unique ID 304 associated with installations or users of the motion detection system 300. Control server 312 can be communicatively coupled to mobile device 302, hub device 308 or node unit 310. Control server 312 can compare a unique ID 304 with a list of unique IDs 314 registered with the control server. By doing so, the control server 312 can generate a list of recipients of a signal in response to a signal being received by mobile device 302 with unique ID 304. The unique IDs 314 stored in memory of the control server can be registered by mobile device 302 possessing APP 306. The unique IDs 314 can also be added by other devices or directly at the server 312. The control server 312 can be proximal to other devices of the motion detection system 300 or can be located in a different location. Control server 312 is not limited to the composition of a server. Control server 312 can be in the form of multiple devices having server functionality, such as a computer, mobile device or other. Control server 312 can also store in memory information received at node unit 310. Control server 312 can facilitate live viewing of the information received by node unit 310 wherein a user can view the information received by node unit 310 from anywhere communication can be achieved.

Entity 110 can be anything detected by motion detection system 300. Entity 110 is not a component of the motion detection system 300, but rather an entity that can be detected by the motion detection system 300. While entity 110 is depicted as a walking person in FIG. 3, entity 110 can be anything detectable by at least one sensor of a node unit 310. Entity can be, but is not limited to, any kind of motion, children, pets, fire, smoke, water, carbon monoxide, residents, guests or deliveries among others. One or more entities 110 can exist and can be individually or concurrently detected by motion detection system 300.

APP 306 can perform different functions relating to the motion detection system 300. APP 306 can be installed on mobile device 302. The installation can possess a unique ID 304. APP 306 can process input and outputs for motion detection system 300.

APP 306 can be a registration point for registering other devices to be authorized to connect and interact with motion detection system 300. APP 306 can also remove registration of devices with motion detection system 300. APP 306 can make entries to the list of unique IDs 314 stored in control server 312 and can likewise remove entries from the unique IDs 116. APP 306 can display the status of devices of the motion detection system 300 and perform diagnostics on the devices.

APP 306 can display information received at node unit 310. APP 306 can control different types or features of node unit 310. For example, in the case that node unit 310 is a camera that can change orientation, APP 306 can control the movement. Other examples of node 310 control can include, adjusting a camera, adjusting a microphone, generating output for a speaker, adjusting sensitivity of the node unit 310, resetting node unit 310 or resetting a signal or alert generated by node unit 310 among controlling many other functions.

In another example, APP 306 can control devices of other systems. For example, APP 306 can issue and receive commands or information from communicatively coupled devices. Examples of such devices can include communicatively connected: electrical plugs, thermostats, garage door openers, locks, entertainment systems, computers, televisions or fans among many others.

APP 306 can run in the background on mobile device 302. Running in the background can allow APP 306 to generate notifications to be displayed on mobile device 302, even when APP 306 is not on screen.

In an example, APP 306 can display its unique ID associated with its installation on mobile device 302.

In another example, APP 306 can also display the unique IDs 314 stored on control server 312.

APP 306 can generate notifications to be received in different forms. For example, APP 306 can generate audible information to be broadcasted on a speaker of mobile device 302 or other device. The audible information, for example, can indicate the location of entity 110 or the type of sensor that was used to detect entity 110.

In another example, APP 306 can generate a visual message on the screen of mobile device 302 or on a different device. The visual message or notification can include a snapshot image taken by a node unit 310.

APP 306 can facilitate technical support with APP 306 and the motion detection system 300. For example a user of APP 306 can navigate to a page with FAQ (frequently asked questions), manuals, user guides, communications links, contact information or other methods for assisting a user of motion detection system 300 or APP 306. The technical support can direct a user to contact information for the APP 306 developer, manufacturer of motion detection system 300, retailer of motion detection system 300 or another contact point.

Unique ID 304 can be a number or string of characters associated with installation of APP 306 on a mobile device 302. Unique ID 304 can be generated at the time of installation, following instructions associated with the code of APP 306.

In one embodiment, unique ID 304 can be permanent and can be the same number or characters if the APP 306 were, for example, removed and re-installed on the same device.

In another embodiment, unique ID 304 can change every time in installation occurs and can change if the APP 306 were removed and re-installed.

Unique IDs (Unique ID list) 314 can comprise a list of registrations of devices authorized to use or be a part of motion detection system 300. Unique IDs 314 can be stored in memory of control server 312. Unique IDs 314 can be stored on other devices of motion detection system 300, for example, on mobile device 302. Unique IDs 314 can be readable by mobile device 302 or other devices.

Communication framework 316 can comprise, but is not limited to: a global communication network such as the Internet that can be employed to facilitate communications devices of motion detection system 300. Communication framework 316 can utilize: IR, shortwave transmission, NFC, Bluetooth, Wi-Fi, LTE, GSM, CDMA, satellite, visual cues or radio waves among others.

In an embodiment, direct communication can be established between mobile device 302 and control server 312.

In another embodiment, communication framework 316 can facilitate communications between other devices of motion detection system 300.

Peripheral 318 is a device associated with motion detection system 300 and can perform different tasks. In one embodiment, peripheral 318 is a vehicle communicatively coupled to mobile device 302. Peripheral 318 can be configured to receive information from mobile device 302 or any device in the motion detection system 300. The information could include a notification or information pertaining to a detection by node unit 310. A message could be displayed on a screen of the peripheral 318 or likewise through a speaker of peripheral 318. Peripheral 318 can take many forms and is not limited to a vehicle. Peripheral 318 can interact with received information via different forms inherent to the functionality of peripheral 318.

Peripheral 320 is a device associated with motion detection system 300 and can perform different tasks. In one embodiment, peripheral 320 is a speaker communicatively coupled to mobile device 302. Peripheral 320 can be wall-powered or battery operated. Peripheral 320 can be configured to receive information from mobile device 302 or any device in the motion detection system 300. The information could include a notification or information pertaining to a detection by node unit 310. For example, peripheral 320 can recite location information or other information pertaining to a detection at node unit 310. Peripheral 320 can take many forms and is not limited to a speaker. Peripheral 320 can interact with received information via different forms inherent to the functionality of peripheral 320.

Peripheral 322 is a device associated with motion detection system 300 and can perform different tasks. In one embodiment, peripheral 322 is a mobile device communicatively coupled to mobile device 302. Peripheral 322 can be wall-powered or battery operated. Peripheral 322 can be configured to receive information from mobile device 302 or any device in the motion detection system 300. The information could include a notification or information pertaining to a detection by node unit 310. For example, peripheral 322 can recite location information or other information pertaining to a detection at node unit 310. In another example, peripheral 322 can display location information or other information pertaining to a detection at node unit 310. Peripheral 322 can take many forms and is not limited to a mobile device. Peripheral 322 can interact with received information via different forms inherent to the functionality of peripheral 322.

Figure 4:
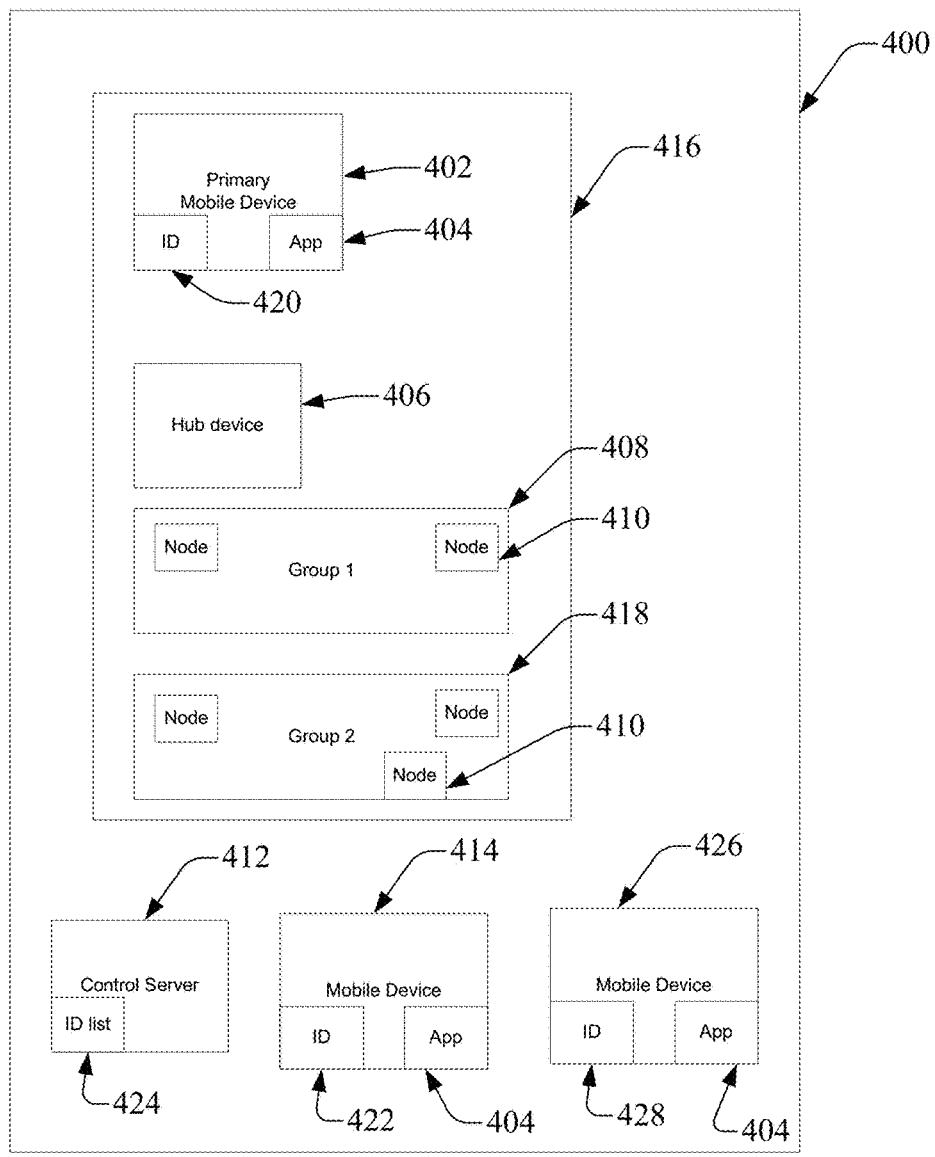
FIG. 4 illustrates a high-level functional diagram of an example motion detection system comprising mobile devices with an APP, server, hub device, node groups and nodes in accordance with various aspects disclosed herein.

Referring now to FIG. 4, there is illustrated a non-limiting exemplary block diagram implantation of a motion detection system 400 in accordance with various aspects of this disclosure. Within motion detection system 400, there resides a local group 416, control server 412 and a mobile device 414 or 426.

Local group 416 comprises groups, devices or components that do not need to be physically coupled, but can be in a proximity to each other by virtue of being proximal to the area of interest with respect to motion or entity detection. Local group 416 can comprise a primary mobile device 402, a hub device 406, and a group of nodes 408 and/or 418. Local group 416 can be located in a home business, outdoor area or any other area that a user of the motion detection system 400 has an interest in monitoring.

Primary mobile device 402 can perform different functions relating to the motion detection system 400. For example, primary mobile device 402 can communicate with a hub device 406, with node 410 or with a control server 412. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Primary mobile device 402 can possess an installation of APP 404. The installation of APP 404 can possess a unique identification (ID) 420 representing a specific installation on the primary mobile device 402. Unique ID 420 can be a number or string of characters associated with installation of APP 404 on a primary mobile device 402. Unique ID 420 can be generated at the time of installation, following instructions associated with the code of APP 404.

In one embodiment, unique ID 420 can be permanent and can be the same number or characters if the APP 404 were, for example, removed and re-installed on the same device.

In another embodiment, unique ID 420 can change every time in installation occurs and can change if the APP 404 were removed and re-installed.

APP 404 can perform different functions relating to the motion detection system 400. APP 404 can be installed on primary mobile device 402, mobile device 414 or mobile device 426 and an installation can possess a unique ID 420, 422 or 428 respectively. APP 404 can process inputs and outputs for motion detection system 400.

APP 404 can be a registration point for registering other devices to be authorized to connect and interact with motion detection system 400. APP 404 can also remove registration of devices with motion detection system 400. APP 404 can make entries to the list of unique IDs 424 stored in control server 412 and can likewise remove entries from the unique ID list 424. APP 404 can display the status of devices of the motion detection system 400 and perform diagnostics on the devices.

APP 404 can display information received at node unit 410. APP 404 can control different types or features of node unit 410. For example, in the case that node unit 410 is a camera that can change orientation, APP 404 can control the movement. Other examples of node 410 control can include, adjusting a camera, adjusting a microphone, generating output for a speaker, adjusting sensitivity of the node unit 410 and resetting node unit 410 or a signal or alert generated by node unit 410 among controlling many other functions.

In an example, APP 404 can control devices of other systems. For example, APP 404 can issue and receive commands or information from communicatively coupled devices. Examples of such devices can include communicatively connected: electrical plugs, thermostats, garage door openers, locks, entertainment systems, computers, televisions or fans among many others.

APP 404 can run in the background on primary mobile device 402, mobile device 414 or mobile device 426. Running in the background can allow APP 404 to generate notifications to be displayed on primary mobile device 402 mobile device 414 or mobile device 426 even when APP 404 is not on screen.

In an example, APP 404 can display its unique ID associated with its installation on primary mobile device 402, mobile device 414 or mobile device 426.

In another example, APP 404 can also display the unique ID list 424 stored on control server 412.

APP 404 can generate notifications to be received in different forms. For example, APP 404 can generate audible information to be broadcasted on a speaker of primary mobile device 402, mobile device 414, mobile device 426 or other device. The audible information, for example, can indicate the location of an entity or the type of detection that was used to detect the entity.

In another example, APP 404 can generate a visual message on the screen of primary mobile device 402, mobile device 414, mobile device 426 or on a different device. The visual message or notification can include a snapshot image taken by a node unit 410.

APP 404 can facilitate technical support with APP 404 and the motion detection system 400. For example a user of APP 404 can navigate to a page with FAQ (frequently asked questions), manuals, user guides, communications links, contact information or other methods for assisting a user of motion detection system 400 or APP 404. The technical support can direct a user to contact information for the APP 404 developer, manufacturer of motion detection system 400, retailer of motion detection system 400 or another contact point.

The hub device 406 can perform different functions relating to the motion detection system 400. For example, the hub device 406 can communicate with the primary mobile device 402, with node 410 or with control server 412. Communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Hub device 406 can be communicatively coupled to devices or can be physically coupled to primary mobile device 402. The physical coupling could be in the form of a case or attached otherwise. The physical coupling can facilitate an electrical coupling. If present, the electrical coupling can facilitate the transfer of electricity or information. The electrical coupling can do so via direct contact or other method of transmission, such as induction.

Node group 408 can comprise one or more node units 410 communicatively coupled to the hub device 406. Node group 408 can exist as a metaphorical grouping and does not need to comprise a physical coupling of node units 410 or exist as a device. Node group 408 can comprise node units 410 acting independently or cooperatively and can comprise node units 410 of the same type or of different types.

In one embodiment, node group 408 can refer to a set of node units 410 grouped in on region of an area to be monitored. A detection of an entity can indicate by any of the node unit 410 of node group 408 that the entity is in a specific area proximal to the node group 408 or any of the node units 410.

Node group 418 can comprise one or more node units 410 communicatively coupled to the hub device 406. Node group 418 can exist as a metaphorical grouping and does not need to comprise a physical coupling of node units 410 or exist as a device. Node group 418 can comprise node units 410 acting independently or cooperatively and can comprise node units 410 of the same type or of different types.

In one embodiment, node group 418 can refer to a set of node units 410 grouped in on region of an area to be monitored. A detection of an entity can indicate by any of the node unit 410 of node group 418 that the entity is in a specific area proximal to the node group 418 or any of the node units 410.

Node unit 410 can perform different functions relating to the motion detection system 400. Multiple node units 410 can exist in motion detection system 400 and there is no limitation on the quantity of node unit 410, however, motion detection system 400 requires at least one node unit 410. Node unit 410 can include one or more sensors, and is not limited to: a location sensor, inertial sensor, optical sensor, audio sensor, distance sensor, water sensor and temperature sensor. These sensors can detect different conditions including, but not limited to, any kind of motion, children, pets, fire, smoke, water, carbon monoxide, residents, guests and deliveries among others. Node unit 410 can be battery operated or wall-powered. It can be a fixed device or readily movable. Node unit 410 can communicate via IR, shortwave transmission, NFC, Bluetooth, Wi-Fi, LTE, GSM, CDMA, satellite, visual cues and radio waves among others. Node unit 410 can detect motion of an entity, however, node unit 410 is not limited to the detection of motion, and motion is only one method of many methods of detection of the motion detection system 400.

Mobile device 414 can perform different functions relating to the motion detection system 400. In one embodiment, mobile device 414 is an authorized device of motion detection system 400 and communicate with a communication framework to obtain information. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues and radio waves among others. Mobile device 414 can possess an installation of APP 404. The installation of APP 404 can comprise a unique ID 422.

Mobile device 426 can perform different functions relating to the motion detection system 400. In one embodiment, mobile device 426 is an authorized device of motion detection system 400 and communicate with a communication framework to obtain information. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues and radio waves among others. Mobile device 426 can possess an installation of APP 404. The installation of APP 404 can comprise a unique ID 428. Unique ID 422 can be a number or string of characters associated with installation of APP 404 on a mobile device 414. Unique ID 422 can be generated at the time of installation, following instructions associated with the code of APP 404.

In one embodiment, unique ID 422 can be permanent and can be the same number or characters if the APP 404 were, for example, removed and re-installed on the same device.

In another embodiment, unique ID 422 can change every time in installation occurs and can change if the APP 404 were removed and re-installed.

Unique ID 428 can be a number or string of characters associated with installation of APP 404 on a mobile device 426. Unique ID 428 can be generated at the time of installation, following instructions associated with the code of APP 404.

In one embodiment, unique ID 428 can be permanent and can be the same number or characters if the APP 404 were, for example, removed and re-installed on the same device.

In another embodiment, unique ID 428 changes every time in installation occurs and can change if the APP 404 were removed and re-installed.

Control server 412 can perform different functions relating to the motion detection system 400. Multiple control servers 412 can exist as motion detection system 400 is not confined to one control server as illustrated in FIG. 4. Control server 412 can store unique ID 420 associated with installations or users of the motion detection system 400. Control server 412 can be communicatively coupled to primary mobile device 402, hub device 406, node unit 410, mobile device 414 or mobile device 426. Control server 412 can compare a unique ID 420 with a unique ID list 424 registered with the control server 412. By doing so, the control server 412 can generate a list of recipients of a signal in response to a signal being received by mobile device 402 with unique ID 420 The unique ID list 424 stored in memory of the control server can be registered by mobile device 402 possessing APP 404. The unique ID list 424 can also be added by other devices or directly at the server 412. The control server 412 can be proximal to other devices of the motion detection system 400 or local group 416 or can be located in a different location. Control server 412 is not limited to the composition of a server. Control server 412 can be in the form of different devices having server functionality, such as a computer, mobile device or other. Control server 412 can also store in memory information received at node unit 410. Control server 412 can facilitate live viewing of the information received by node unit 410 wherein a user can view the information received by node unit 410 from anywhere communication is possible.

Unique ID list 424 can comprise registrations of devices authorized to use or be a part of motion detection system 400. Unique ID list 424 can be stored in memory of control server 412. Unique ID list 424 can be stored on other devices of motion detection system 400, for example, on primary mobile device 402, mobile device 414 or mobile device 426. Unique ID list 424 can be readable by primary mobile device 402, mobile device 414, mobile device 426 or other devices.

Figure 5:
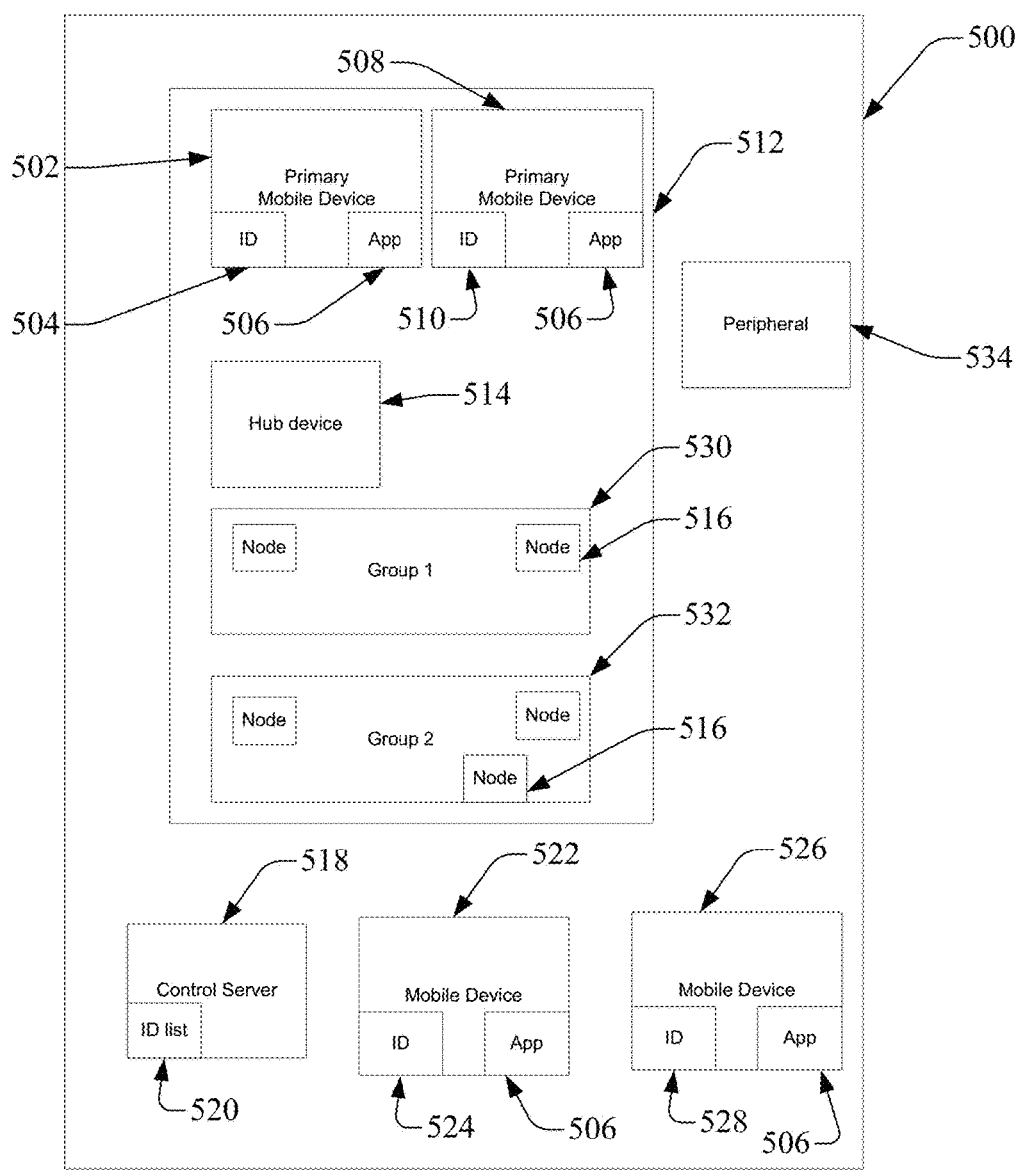
FIG. 5 illustrates a high-level functional diagram of an example motion detection system comprising mobile devices with an APP, server, hub device, node groups, nodes and a peripheral device in accordance with various aspects disclosed herein.

Referring now to FIG. 5, there is illustrated a non-limiting exemplary block diagram implantation of a motion detection system 500 in accordance with various aspects of this disclosure. Within motion detection system 500, there resides a local group 512, control server 518 and a mobile device 522 or 526.

Local group 512 comprises groups, devices or components that do not need to be physically coupled, but can be in a proximity to each other by virtue of being proximal to the area of interest with respect to motion or entity detection. Local group 512 can comprise a primary mobile device 502, a primary mobile device 508, a hub device 514, and a group of nodes 530 and/or 532. Local group 512 can be located in a home business, outdoor area or any other area that a user of the motion detection system 500 has an interest in monitoring.

Primary mobile device 502 can perform different functions relating to the motion detection system 500. For example, primary mobile device 502 can communicate with a hub device 514 or with a control server 518. Primary mobile device 502 can communicate directly with any of nodes 516. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Primary mobile device 502 can possess an installation of APP 506. The installation of APP 506 can possess a unique identification (ID) 504 representing that specific installation on the primary mobile device 502.

Primary mobile device 508 can perform different functions relating to the motion detection system 500. For example, primary mobile device 508 can communicate with a hub device 514 or with a control server 518. Primary mobile device 508 can communicate directly with any of nodes 516. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Primary mobile device 508 can possess an installation of APP 506. The installation of APP 506 can possess a unique identification (ID) 510 representing that specific installation on the primary mobile device 508.

APP 506 can perform different functions relating to the motion detection system 500. APP 506 can be installed on primary mobile device 502, primary mobile device 508, mobile device 522 or mobile device 526 and an installation can possess a unique ID 504, 510, 524 or 528 respectively. APP 506 can process inputs and outputs for motion detection system 500.

APP 506 can be a registration point for registering other devices to be authorized to connect and interact with motion detection system 500. APP 506 can also remove registration of devices with motion detection system 500. APP 506 can make entries to the list of unique ID list 520 stored in control server 518 and can likewise remove entries from the unique ID list 520. APP 506 can display the status of devices of the motion detection system 500 and perform diagnostics on the devices.

APP 506 can display information received at node unit 516. APP 506 can control different types or features of node unit 516. For example, in the case that node unit 516 is a camera that can change orientation, APP 506 can control the movement. Other examples of node 516 control can include, adjusting a camera, adjusting a microphone, generating output for a speaker, adjusting sensitivity of the node unit 516 and resetting node unit 516 or a signal or alert generated by node unit 516 among controlling many other functions.

In an example, APP 506 can control devices of other systems. For example, APP 506 can issue and receive commands or information from communicatively coupled devices. Examples of such devices can include communicatively connected: electrical plugs, thermostats, garage door openers, locks, entertainment systems, computers, televisions and fans among many others.

APP 506 can run in the background on primary mobile device 502, primary mobile device 508, mobile device 522 or mobile device 526. Running in the background can allow APP 506 to generate notifications to be displayed on primary mobile device 502, primary mobile device 508, mobile device 522 or mobile device 526, even when APP 506 is not on screen.

In an example, APP 506 can display its unique ID associated with its installation on primary mobile device 502, primary mobile device 508, mobile device 522 or mobile device 526.

In another example, APP 506 can display the unique ID list 520 stored on control server 518.

APP 506 can generate notifications to be received in different forms. For example, APP 506 can generate audible information to be broadcasted on a speaker of primary mobile device 502, primary mobile device 508, mobile device 522, mobile device 526 or other device. The audible information, for example, can indicate the location of an entity or the type of detection that was used to detect the entity.

In another example, APP 506 can generate a visual message on the screen of primary mobile device 502, primary mobile device 508, mobile device 522, mobile device 526 or on a different device. The visual message or notification can include a snapshot image taken by a node unit 516.

APP 506 can facilitate technical support with APP 506 and the motion detection system 500. For example, a user of APP 506 can navigate to a page with FAQ (frequently asked questions), manuals, user guides, communications links, contact information or other methods for assisting a user of motion detection system 500 or APP 506. The technical support can direct a user to contact information for the APP 506 developer, manufacturer of motion detection system 500, retailer of motion detection system 500 or another contact point.

Unique ID 504 can be a number or string of characters associated with installation of APP 506 on a primary mobile device 502. Unique ID 504 can be generated at the time of installation, following instructions associated with the code of APP 506.

In one embodiment, unique ID 504 can be permanent and can be the same number or characters if the APP 506 were, for example, removed and re-installed on the same device.

In another embodiment, unique ID 504 can change every time in installation occurs and can change if the APP 506 were removed and re-installed.

Unique ID 510 can be a number or string of characters associated with installation of APP 506 on a primary mobile device 508. Unique ID 510 can be generated at the time of installation, following instructions associated with the code of APP 506.

In one embodiment, unique ID 510 can be permanent and can be the same number or characters if the APP 506 were, for example, removed and re-installed on the same device.

In another embodiment, unique ID 510 can change every time in installation occurs and can change if the APP 506 were removed and re-installed.

The hub device 514 can perform different functions relating to the motion detection system 500. For example, the hub device 514 can communicate with the primary mobile device 502, primary mobile device 508, with node 516 or with control server 518. Communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Hub device 514 can be communicatively coupled to devices or can be physically coupled to primary mobile device 502 or primary mobile device 508. The physical coupling could be in the form of a case or attached otherwise. The physical coupling can facilitate an electrical coupling. If present, the electrical coupling can facilitate the transfer of electricity or information. The electrical coupling can do so via direct contact or other method of transmission, such as induction.

Node group 530 can comprise one or more node units 516 communicatively coupled to the hub device 514. Node group 530 can exist as a metaphorical grouping and does not need to comprise a physical coupling of node units 516 or exist as a device. Node group 530 can comprise node units 516 acting independently or cooperatively and can comprise node units 516 of the same type or of different types.

In one embodiment, node group 530 can refer to a set of node units 516 grouped in on region of an area to be monitored. A detection of an entity can indicate by any of the node unit 516 of node group 530 that the entity is in a specific area proximal to the node group 530 or any of the node units 516.

Node group 532 can comprise one or more node units 516 communicatively coupled to the hub device 514. Node group 532 can exist as a metaphorical grouping and does not need to comprise a physical coupling of node units 516 or exist as a device. Node group 532 can comprise node units 516 acting independently or cooperatively and can comprise node units 516 of the same type or of different types.

In one embodiment, node group 532 can refer to a set of node units 516 grouped in on region of an area to be monitored. A detection of an entity can indicate by any of the node unit 516 of node group 532 that the entity is in a specific area proximal to the node group 532 or any of the node units 516.

Node unit 516 can perform different functions relating to the motion detection system 500. Node units 516 can exist in motion detection system 500 and there is no limitation on the quantity of node unit 516. Node unit 516 can include one or more sensors and is not limited to: a location sensor, inertial sensor, optical sensor, audio sensor, distance sensor, water sensor or temperature sensor. These sensors can detect different conditions including, but not limited to, any kind of motion, children, pets, fire, smoke, water, carbon monoxide, residents, guests or deliveries among others. Node unit 516 can be battery operated or wall-powered. It can be a fixed device or readily movable. Node unit 516 can communicate via IR, shortwave transmission, NFC, Bluetooth, Wi-Fi, LTE, GSM, CDMA, satellite, visual cues or radio waves among others. Node unit 516 can detect motion of an entity, however, node unit 516 is not limited to the detection of motion, and motion is only one method of many methods of detection of the motion detection system 500.

Mobile device 522 can perform different functions relating to the motion detection system 500. In one embodiment, mobile device 522 is an authorized device of motion detection system 500 and can communicate with a communication framework to obtain information. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Mobile device 522 can possess an installation of APP 506. The installation of APP 506 can comprise a unique ID 524.

Mobile device 526 can perform different functions relating to the motion detection system 500. In one embodiment, mobile device 526 is an authorized device of motion detection system 500 and can communicate with a communication framework to obtain information. These communications can be directly through a wire or over the air (OTA) via different possible methods. For example, mobile device can communicate via IR, shortwave transmission, NFC, Bluetooth, Wi-Fi, LTE, GSM, CDMA, satellite, visual cues or radio waves among others. Mobile device 526 can possess an installation of APP 506. The installation of APP 506 can comprise a unique ID 528.

Unique ID 524 can be a number or string of characters associated with installation of APP 506 on a mobile device 522. Unique ID 524 can be generated at the time of installation, following instructions associated with the code of APP 506.

In one embodiment, unique ID 524 can be permanent and can be the same number or characters if the APP 506 were, for example, removed and re-installed on the same device.

In another embodiment, unique ID 524 can change every time in installation occurs and can change if the APP 506 were removed and re-installed.

Unique ID 528 can be a number or string of characters associated with installation of APP 506 on a mobile device 526. Unique ID 528 can be generated at the time of installation, following instructions associated with the code of APP 506.

In one embodiment, unique ID 528 can be permanent and can be the same number or characters if the APP 506 were, for example, removed and re-installed on the same device.

In another embodiment, unique ID 528 can change every time in installation occurs and can change if the APP 506 were removed and re-installed.

Control server 518 can perform different functions relating to the motion detection system 500. A group of control servers 518 can exist as motion detection system 500 is not confined to one control server as illustrated in FIG. 5. Control server 518 can store unique ID 504, 510, 524 or 528 associated with installations or users of the motion detection system 500. Control server 518 can be communicatively coupled to primary mobile device 502, primary mobile device 508, hub device 514, node unit 516, mobile device 522 or mobile device 526. Control server 518 can compare a unique ID 504 or 510 with a unique ID list 520 registered with the control server 518. By doing so, the control server 518 can generate a list of recipients of a signal in response to a signal being received by mobile device 502 or 508 with unique ID 504 or 510 respectively. The unique ID list 520 stored in memory of the control server can be registered by mobile device 502 or 508 possessing APP 506. The unique ID list 520 can also be added by other devices or directly at the server 518. The control server 518 can be proximal to other devices of the motion detection system 500 or local group 512 or can be located in a different location. Control server 518 is not limited to the composition of a server. Control server 518 can be in the form of different devices having server functionality, such as a computer, mobile device or other. Control server 518 can also store in memory information received at node unit 516. Control server 518 can facilitate live viewing of the information received by node unit 516 wherein a user can view the information received by node unit 516 from anywhere communication is possible.

Unique ID list 520 can comprise registrations of devices authorized to use or be a part of motion detection system 500. Unique ID list 520 can be stored in memory of control server 518. Unique ID list 520 can be stored on other devices of motion detection system 500, for example, on primary mobile device 502, primary mobile device 508, mobile device 522 or mobile device 526. Unique ID list 520 can be readable by primary mobile device 502, primary mobile device 508, mobile device 522, mobile device 526 or other devices.

Peripheral 534 is a device associated with motion detection system 500 and can perform different tasks. Peripheral 534 can be configured to receive information from primary mobile device 502, primary mobile device 508 or any device in the motion detection system 500. The information could include a notification or information pertaining to a detection by node unit 516. For example, peripheral 534 can recite location information or other information pertaining to a detection at node unit 516. Peripheral 534 can be one of many forms. Peripheral 534 can interact with received information via different forms inherent to the functionality of peripheral 534

Figure 6:
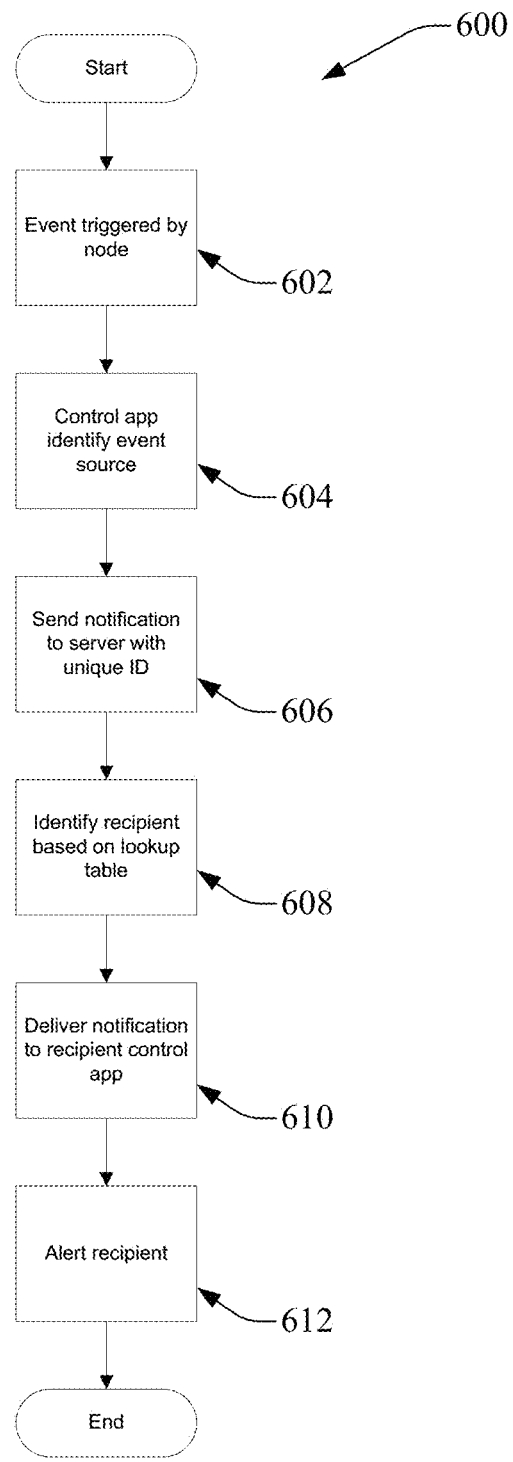
FIG. 6 is a flowchart of an example methodology for a motion detection system observing an event and ultimately alerting a recipient.

FIG. 6 is a flowchart exemplifying the operations 600 associated with a situation in which an entity is detected by a sensor, which ultimately leads a recipient being alerted. At 602, an event is detected by a node unit. The event can be detected by observing any kind of motion, children, pets, fire, smoke, water, carbon monoxide, residents, guests or deliveries among others. At 604, a control application (APP) identifies the source of the event. The control application can identify which node unit was triggered, where the node unit is located, when the event was triggered, what type of entity caused the node unit to be triggered or other information relating to the event source. At 606, a signal is sent to a control server notifying that an event has occurred and containing information relating to the event. At 608, the control server identifies the appropriate recipient(s) for a notification based on a lookup table. Unique IDs of the mobile application installation on a mobile device can be used to determine other Unique IDs registered to receive the notification. At 610, notifications are delivered to recipient application(s) on the registered installation(s) identified in the lookup table. At 612, the mobile application(s) of the device(s) receiving a signal from the control server alert the user(s) of the device(s) that an event has been triggered by a node unit. Other information can also be delivered.

Figure 7:
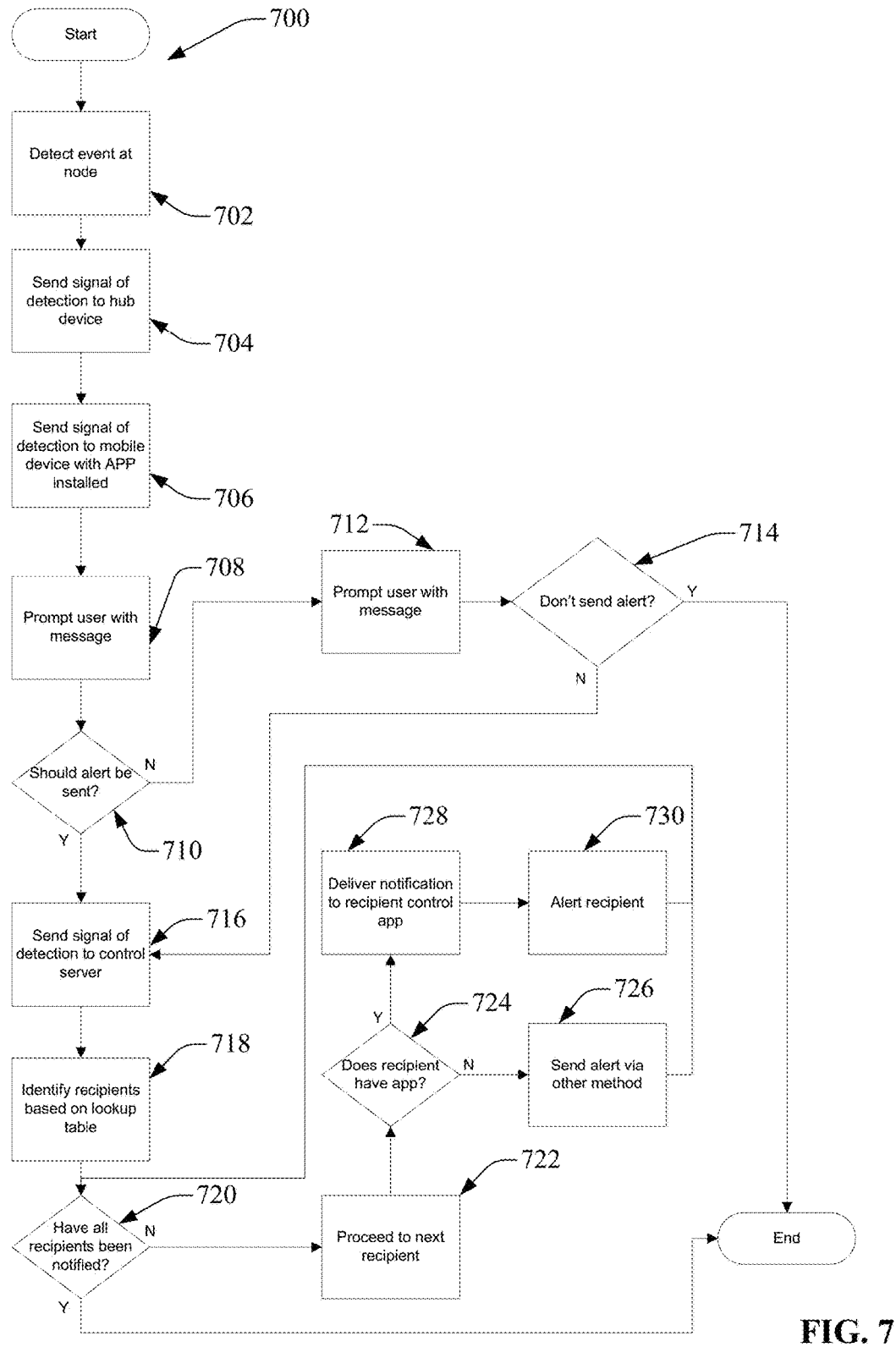
FIG. 7 is a flowchart of an example methodology for a motion detection system observing an event, receiving input from a user and accordingly taking action.

FIG. 7 is a flowchart exemplifying the operations 700 associated with a situation in which an entity is detected by a sensor, which ultimately leads a recipient being alerted. At 702, an event is detected by a node unit. The event can be detected by any kind of motion, children, pets, fire, smoke, water, carbon monoxide, residents, guests or deliveries among others. At 704, a signal is sent from the node unit to a hub device. At 706, the hub device then relays the information from its received signal to a mobile device possessing a mobile application (APP). At 708, the APP prompts the user of the mobile device with a message. At 710, the user is asked to input whether an alert should be sent. If an alert is to be sent (Y at 710), the system proceeds to 716. Alternatively, if an alert is not to be sent (N at 710), the system proceeds to 712. At 712, if the user choose not to send an alert, the user is prompted with a message. At 714, the user is asked to confirm that the alert should not be sent. This can be a safety measure. If the user still does not want to send an alert (Y at 714), the process ends. If the user made a mistake or chose no for some other reason, and decides that an alert should be sent (N at 714), the system proceeds to 716. At 716, a signal is sent to a control server that an event or detection has occurred. At 718, recipients for an alert are identified. At 720, the control server determines whether all recipients have been notified. If all have (Y at 720), the process ends. If recipients still need to be sent a notification (N at 720), the system proceeds to 722. At 722, the control server loads a recipient to be sent a notification. At 724, the control server determines whether the recipient uses a registered app of the system or if the recipient uses an alternate method for receiving alerts. At 726, if the recipient does not use a registered app (N at 724), but is registered to receive alerts such as through a text message, phone call, email, or other method, an alert is sent to that recipient through that respective method at 726, then the process returns to 720. If at 724 the recipient is determines to be using a registered app (Y at 724), the system proceeds to 728. At 728, an alert is delivered to the recipient app. At 730, the recipient app provides an alert notification to the user of that app, and the system proceeds to 720.

Figure 8:
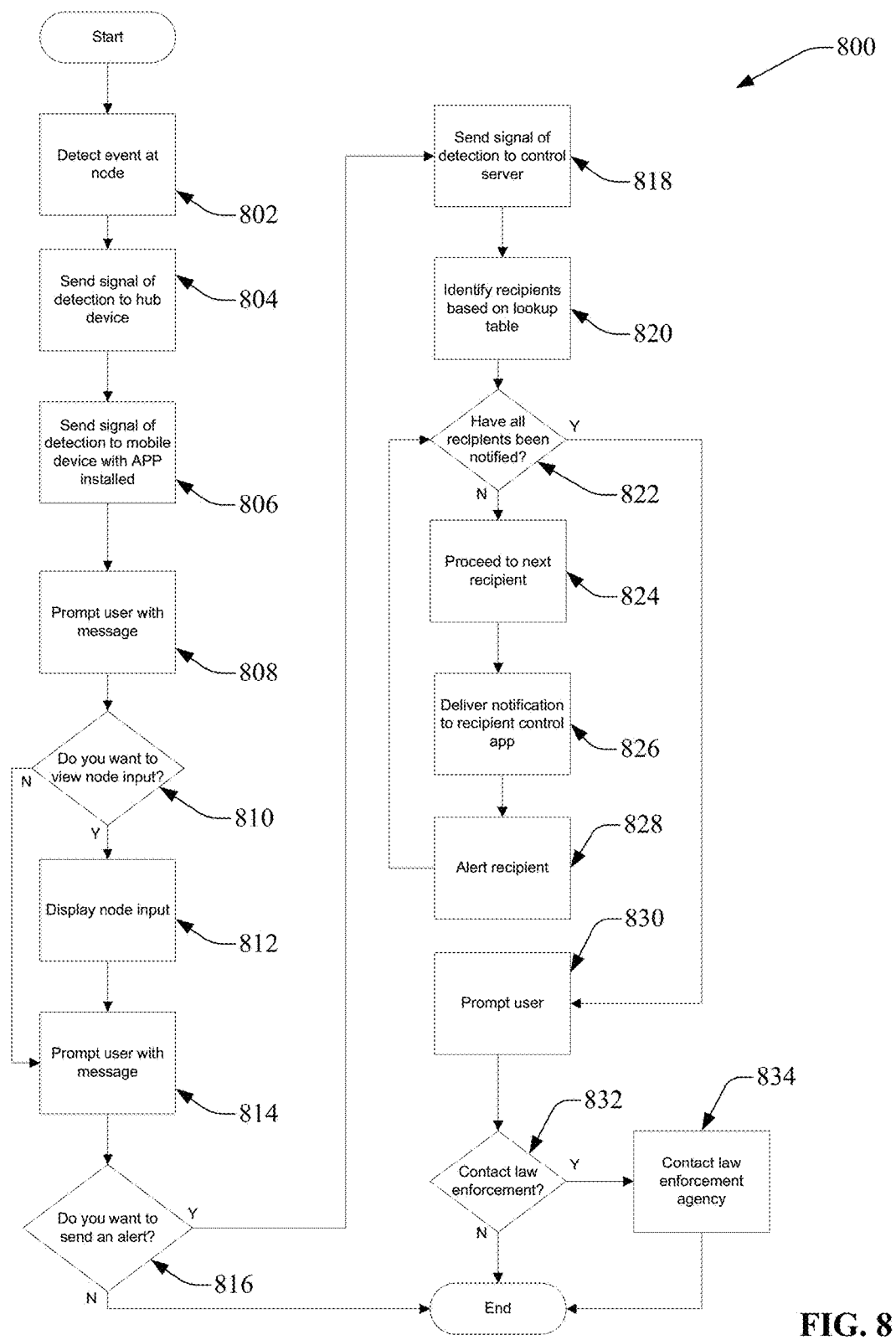
FIG. 8 is a flowchart of an example methodology for a motion detection system observing an event, receiving input from a user and accordingly taking action.

FIG. 8 is a flowchart exemplifying the operations 800 associated with a situation in which an entity is detected by a sensor, which ultimately leads a recipient being alerted. A user can also decide to inform law enforcement of the detection. At 802, an event is detected by a node unit. The event can be detected by any kind of motion, children, pets, fire, smoke, water, carbon monoxide, residents, guests or deliveries among others. At 804, a signal is sent from the node unit to a hub device. At 806, the hub device then relays the information from its received signal to a mobile device possessing a mobile application (APP). At 808, the APP prompts the user of the mobile device with a message. At 810, the user is asked whether to display the information received by the node unit identifying the event. The APP can display a recording or live data. If the user does not wish to view node input (N at 810), the process proceeds to 814. If the user wishes to view node input (Y at 810), the process proceeds to 812. At 812, node input is displayed on the APP. At 814, the user is prompted with a message. At 816, the user is asked to select whether or not to send an alert. If the user does not wish to send an alert (N at 816), the process ends. If the user wishes to send an alert (Y at 816), the system proceeds to 818. At 818, a signal of the detection is sent to the control server. At 820, recipients of a message are identified by the control server. At 822, if all recipients have been notified (Y at 822), the system proceeds to 830. If all recipients have not been notified (N at 822), the system proceeds to 824. At 824, the control server loads a recipient to be sent a notification. At 826, an alert is delivered to a recipient app. At 828, the recipient app delivers an alert notification to the user of that app, and the system proceeds to 822. At 830, a user receives a prompt on the APP. At 832, a user is prompted to input whether a law enforcement agency should be contacted. If the user does not wish to have a law enforcement agency contacted (N at 832), the process ends. If the user wishes to have a law enforcement agency contacted (Y at 832), the process proceeds to 834. At 834, the law enforcement agency is contacted. This can occur via a text message, phone call, email, radio or other method. The law enforcement agency can be a local law enforcement agency, such as local police, or a different law enforcement agency. The agency can be predetermined or chosen by the user.

Figure 9:
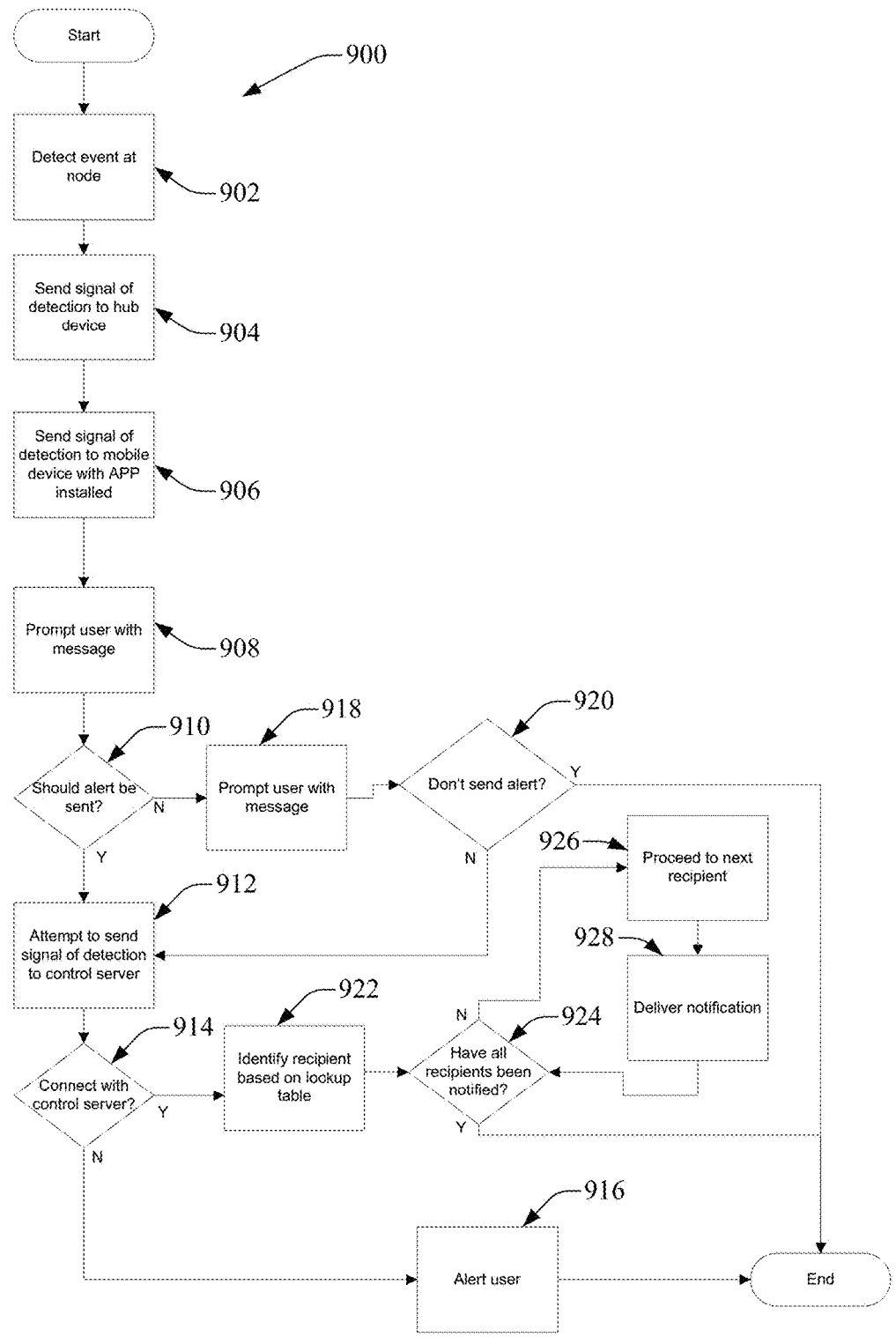
FIG. 9 is a flowchart of an example methodology for a motion detection system observing an event, receiving input from a user and accordingly taking action.

FIG. 9 is a flowchart exemplifying the operations 900 associated with a situation in which an entity is detected by a sensor, which ultimately leads a recipient being alerted. At 902, an event is detected by a node unit. The event can be detected by any kind of motion, children, pets, fire, smoke, water, carbon monoxide, residents, guests or deliveries among others. At 904, a signal is sent from the node unit to a hub device. At 906, the hub device then relays the information from its received signal to a mobile device possessing a mobile application (APP). At 908, the APP prompts the user of the mobile device with a message. At 910, the user is asked to input whether an alert should be sent. At 918, if the user choose not to send an alert (N at 910), the user is prompted with a message. At 920, the user is asked to confirm that the alert should not be sent. This can be a safety measure. If the user still does not want to send an alert (Y at 920), the process ends. If the user made a mistake or chose no for some other reason, and decides that an alert should be sent (N at 920), the system proceeds to 912. If, at 910, the user chooses to send an alert (Y at 910), the system proceeds to 912. At 912, the APP attempts to send a signal to the control server. At 914, the APP determines whether the control server successfully received the signal. If the APP was not successful (N at 914), the system proceeds to 916. At 916, the user is alerted of the status and the process ends. If the APP successfully delivered the signal to the control server (Y at 914), the system proceeds to 922. At 922, recipients of a message are identified. At 924, if all recipients have been notified (Y at 924), the process ends. If all recipients have not been notified (N at 924), the system proceeds to 926. At 926, the control server loads a recipient to be sent a notification. At 928, an alert is delivered to the recipient app and the system proceeds to 924.

Figure 10:
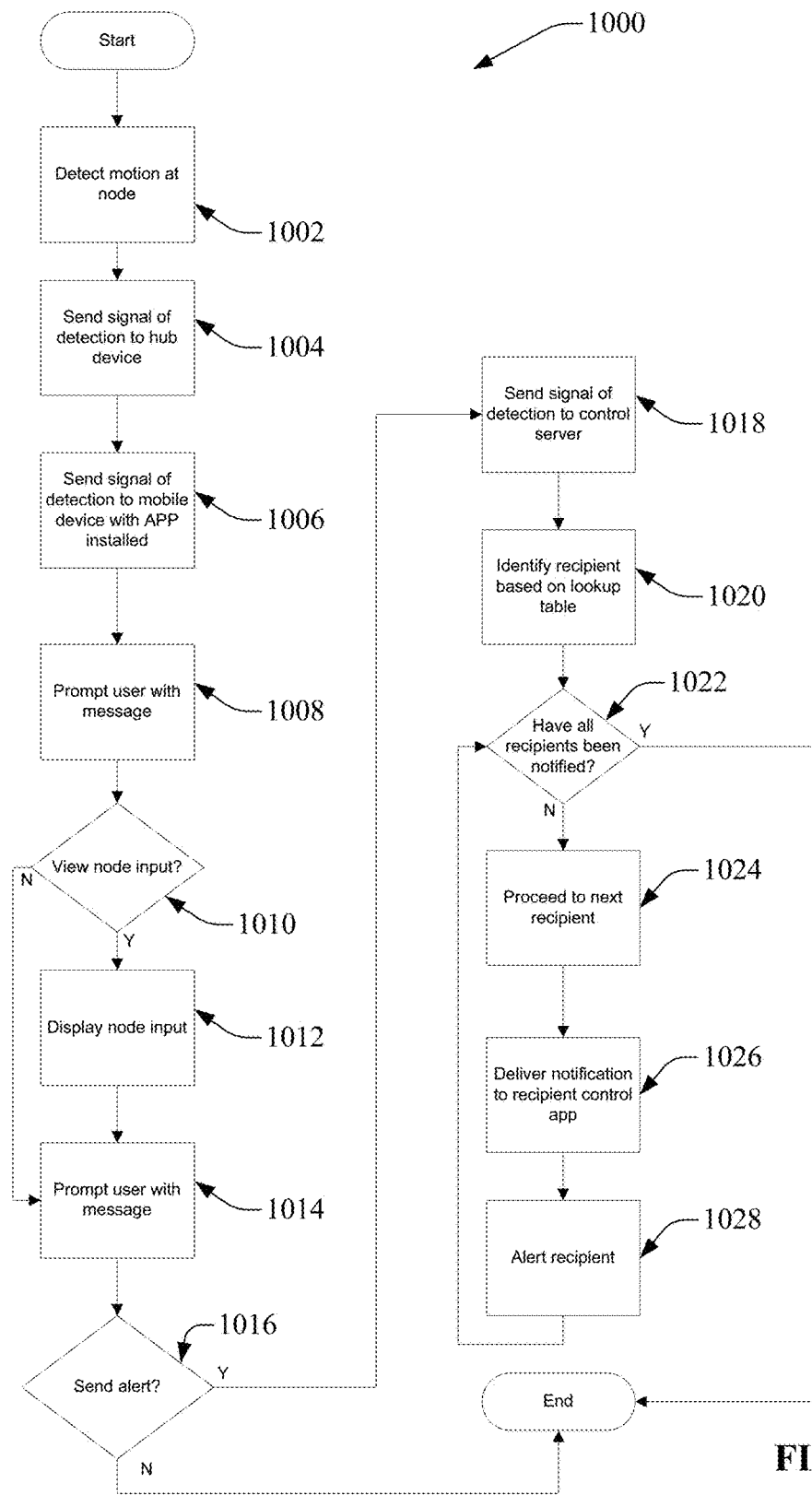
FIG. 10 is a flowchart of an example methodology for a motion detection system observing an event, receiving input from a user and accordingly taking action.

FIG. 10 is a flowchart exemplifying the operations 1000 associated with a situation in which an entity is detected by a sensor, which ultimately leads a recipient being alerted. At 1002, an event is detected by a node unit. The event can be detected by any kind of motion, children, pets, fire, smoke, water, carbon monoxide, residents, guests or deliveries among others. At 1004, a signal is sent from the node unit to a hub device. At 1006, the hub device then relays the information from its received signal to a mobile device possessing a mobile application (APP). At 1008, the APP prompts the user of the mobile device with a message. At 1010, the user is asked whether to display the information received by the node unit identifying the event. The APP can display a recording or live data. If the user does not wish to view node input (N at 1010), the process proceeds to 1014. If the user wishes to view node input (Y at 1010), the process proceeds to 1012. At 1012, node input is displayed on the APP. At 1014, the user is prompted with a message. At 1016, the user is asked to decide whether or not to send an alert. If the user does not wish to send an alert (N at 1016), the process ends. If the user wishes to send an alert (Y at 1016), the system proceeds to 1018. At 1018, a signal of the detection is sent to the control server. At 1020, recipients of a message are identified. At 1022, if all recipients have been notified by the control server (Y at 1022), the process ends. If all recipients have not been notified by the control server (N at 1022), the system proceeds to 1024. At 1024, the control server loads a recipient to be sent a notification. At 1026, an alert is delivered to the recipient app. At 1028, an alert is delivered to the recipient app and the system proceeds to 1022.

Figure 11:
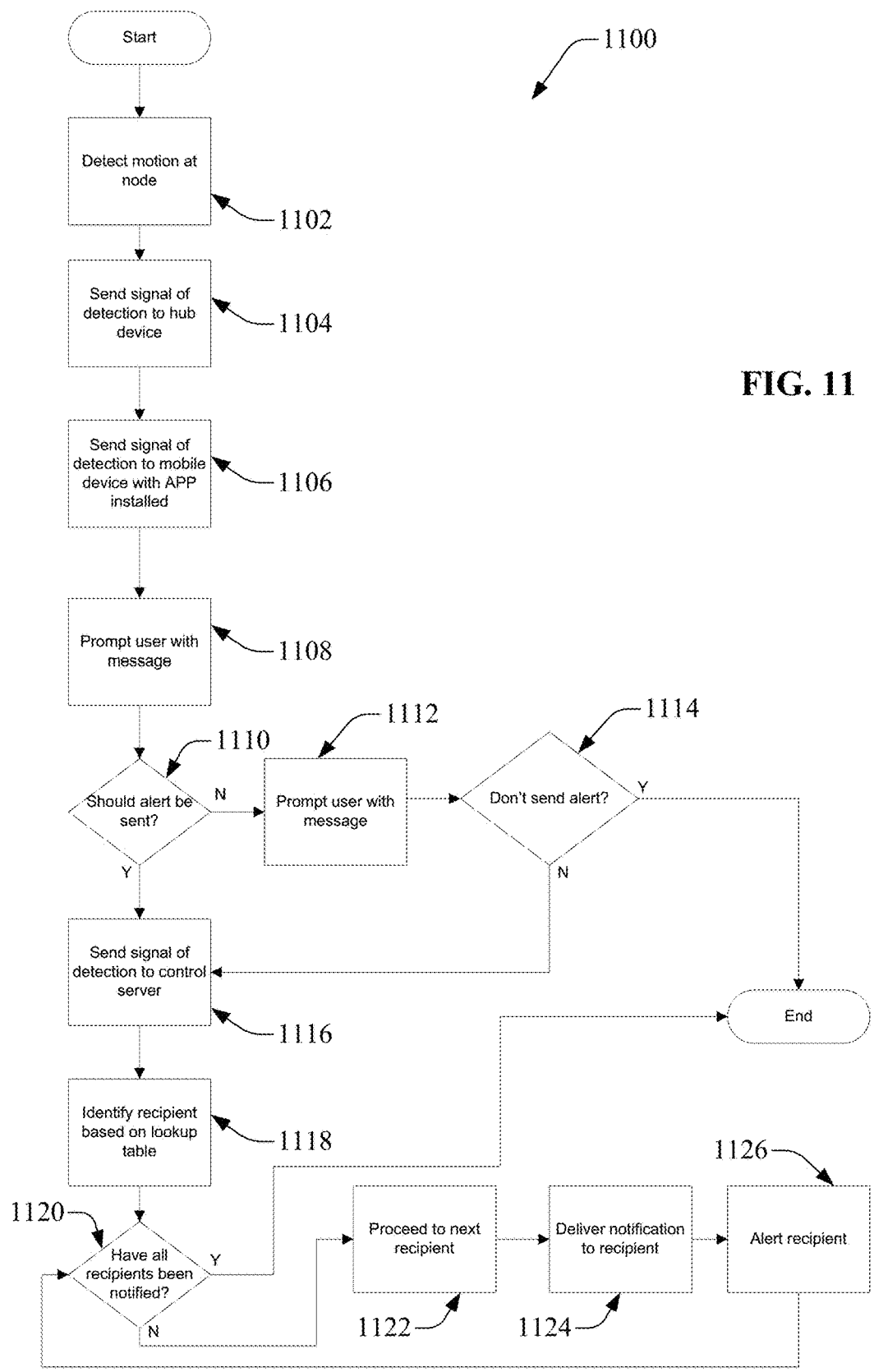
FIG. 11 is a flowchart of an example methodology for a motion detection system observing an event, receiving input from a user and accordingly taking action.

FIG. 11 is a flowchart exemplifying the operations 1100 associated with a situation in which an entity is detected by a sensor, which ultimately leads a recipient being alerted. At 1102, an event is triggered by a node unit. The event can be triggered by any kind of motion, children, pets, fire, smoke, water, carbon monoxide, residents, guests and deliveries among others. At 1104, a signal is sent from the node unit to a hub device. At 1106, the hub device then relays the information from its received signal to a mobile device possessing a mobile application (APP). At 1108, the APP prompts the user of the mobile device with a message. At 1110, the user is asked to input whether an alert should be sent. If an alert is to be sent (Y at 1110), the system proceeds to 1116. Alternatively, if an alert is not to be sent (N at 1110), the system proceeds to 1112. At 1112, if the user choose not to send an alert, the user is prompted with a message. At 1114, the user is asked to confirm that the alert should not be sent. This can be a safety measure. If the user still does not want to send an alert (Y at 1114), the process ends. If the user made a mistake or chose no for some other reason, and decides that an alert should be sent (N at 1114), the system proceeds to 1116. At 1116, a signal is sent to a control server that an event or detection has occurred. At 1118, recipients of an alert are identified. At 1120, the control server determines whether all recipients have been notified. If all have (Y at 1120), the process ends. If recipients still need to be sent a notification (N at 1120), the system proceeds to 1122. At 1122, the control server loads a recipient to be sent a notification. At 1124, an alert is delivered to the recipient app. At 1126, the recipient app delivers an alert notification to the user of that app, and the system proceeds to 1120.

Figure 12:
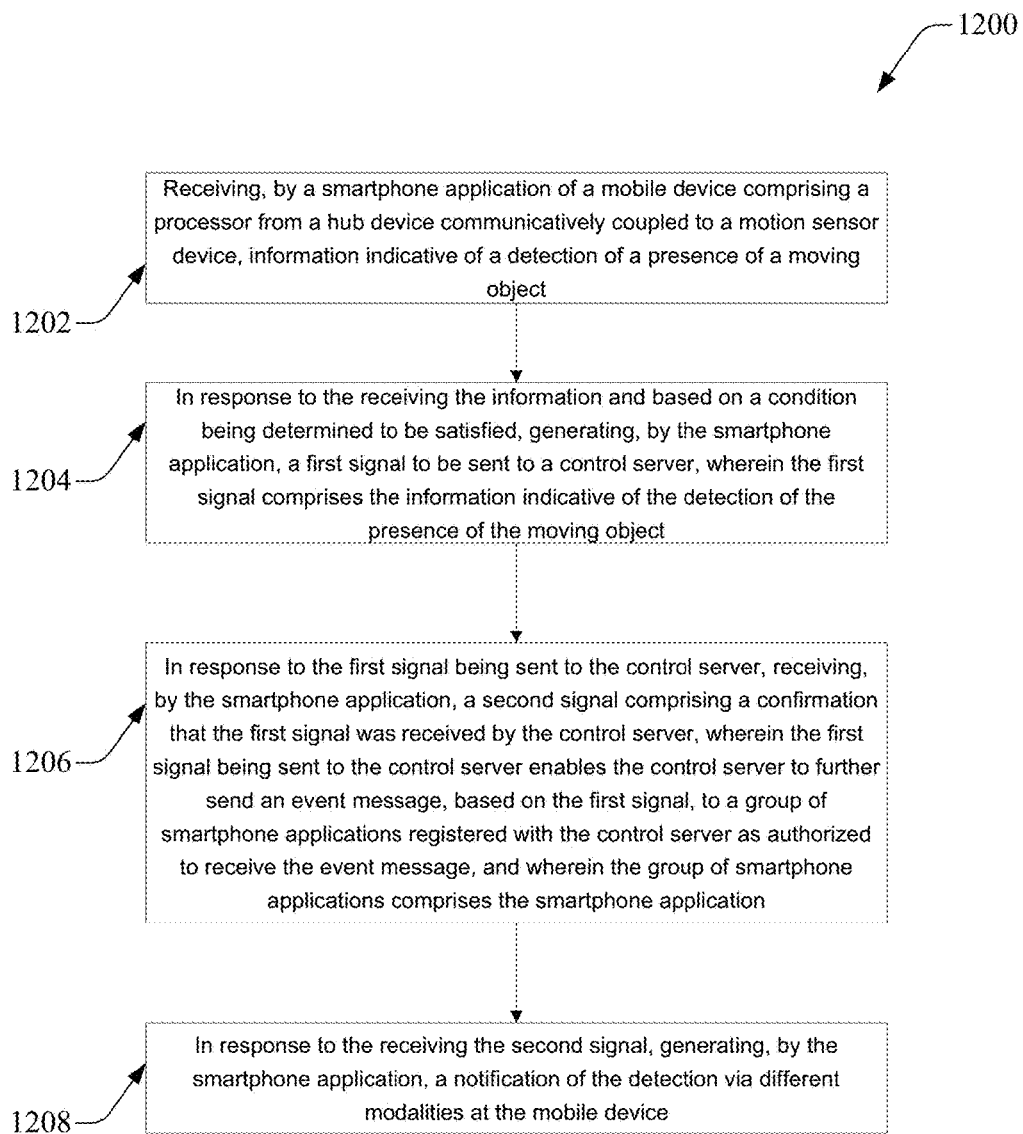
FIG. 12 is a process diagram of an example process in which an APP of a motion or event detection system receives a signal and ultimately sends a notification.

Referring now to FIG. 12, illustrated is a flow diagram of a process 1200 for a smartphone application receiving a signal indicative of a presence of a moving object and ultimately generating a notification. At 1202, an APP of a smartphone comprising a processor receives (e.g., via a communication component) information indicative of a detection of a presence of a moving object from a hub device. The hub device is communicatively coupled to a motion sensor device.

At 1204, smartphone application generates a first signal (at least one of IR, shortwave transmission, NFC, Bluetooth, Wi-Fi, LTE, GSM, CDMA, satellite, visual cues or radio waves among others) to be sent to a control server. That first signal comprises information indicative of the detection of the presence of the moving object. The smartphone can generate the aforementioned first signal if a condition has been determined to be satisfied.

At 1206, in response to the first signal being sent, the smartphone application receives a second signal (at least one of IR, shortwave transmission, NFC, Bluetooth, Wi-Fi, LTE, GSM, CDMA, satellite, visual cues or radio waves among others) comprising a confirmation that the first signal was received by the control server.

The first signal being sent to the control server enables the control server to include an event message in the second signal to a group of smartphone applications registered with the control server as authorized to receive the event message. Each of the smartphone in the group of smartphones possesses the smartphone application.

At 1208, in response to receiving the second signal, the smartphone application generates a notification of the detection via different modalities at the mobile device. The different modalities can include, but are not limited to, a display, speaker or other function of the smartphone.

Figure 13:
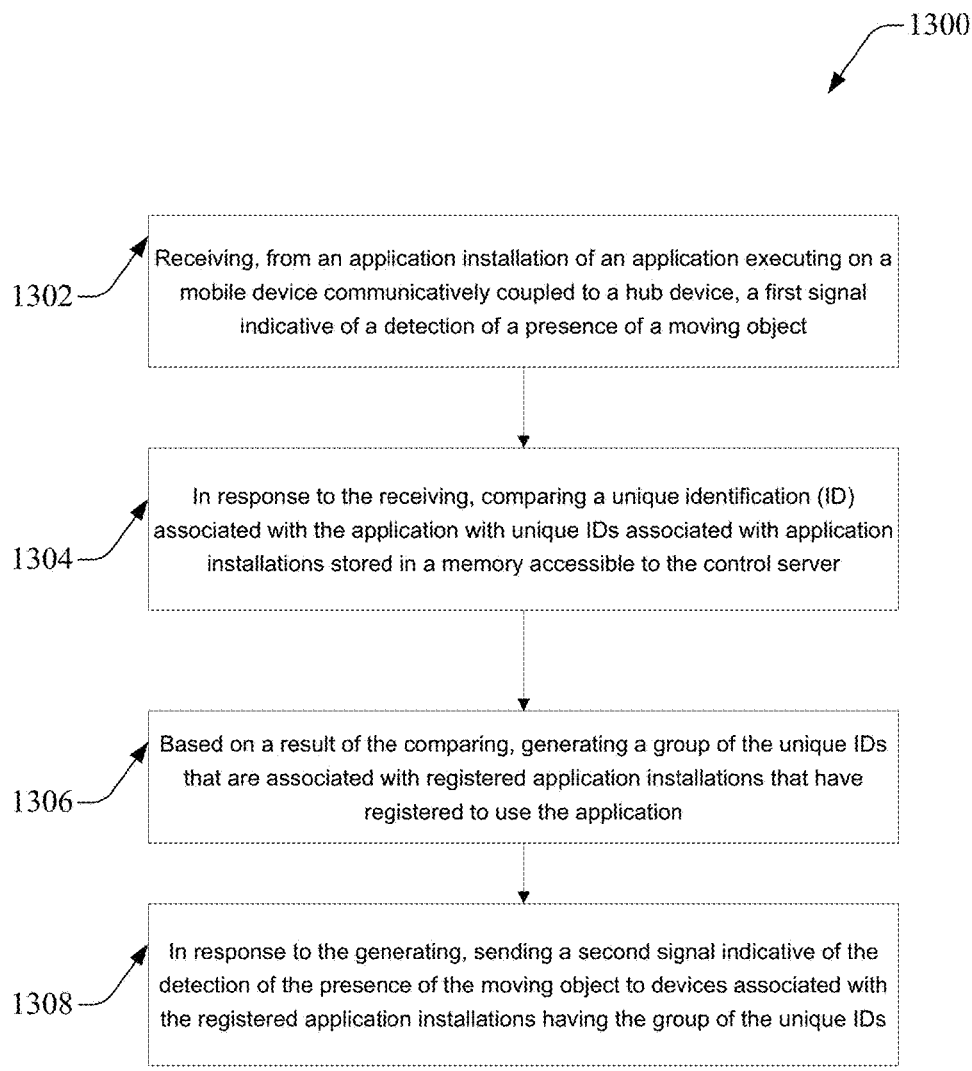
FIG. 13 is a process diagram of an example process in which a server of a motion or event detection system receives a signal and ultimately sends a signal.

Referring now to FIG. 13, illustrated is a flow diagram of a process 1300 for a control server receiving a signal indicative of a presence of a moving object and ultimately sending a signal to registered application installations, each possessing one the unique IDs of a list of unique IDs. At 1302, the control server receives, from an application installation executing on a mobile device communicatively coupled to a hub device and comprising a processor, a first signal indicative of a detection of a presence of a moving object.

At 1304, in response to receiving the first signal, the control server compares a unique identification (ID) associated with the application with unique IDs associated with application installations stored in a memory accessible to the control server.

At 1306, based upon the results of the comparison, the control server generates a group of the unique IDs that are associated with registered application installations that have registered to use the application.

At 1308, in response to generating the group of unique IDs, the control server sends a second signal indicative of the detection of the presence of the moving object to devices associated with the registered application installations having the group of the unique IDs.

Figure 14:
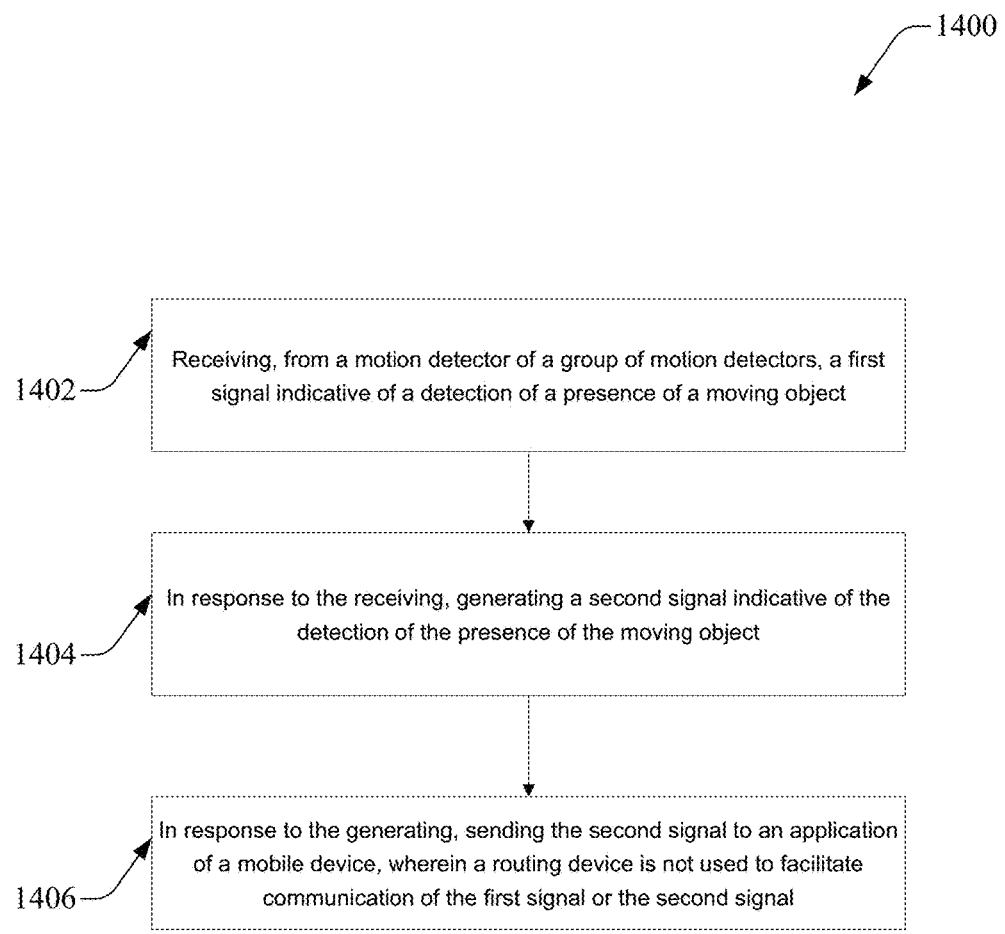
FIG. 14 is a process diagram of an example process in which a hub device of a motion or event detection system receives a signal and ultimately sends a signal.

Referring now to FIG. 14, illustrated is a flow diagram of a process 1400 for a hub device receiving a signal indicative of a presence of a moving object and ultimately sending a signal to an application of a mobile device. At 1402, the hub device receives from a motion detector of a group of motion detectors, a first signal indicative of a detection of a presence of a moving object.

At 1404, in response to receiving the first signal, the hub device generates a second signal indicative of the detection of the presence of the moving object.

At 1406, in response to generating the second signal, the hub device sends the second signal to an application of a mobile device. A routing device is not used to facilitate communication of the first or second signal.

FIGS. 6-14 as described above illustrate respective methods in accordance with certain aspects of this disclosure. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 15:
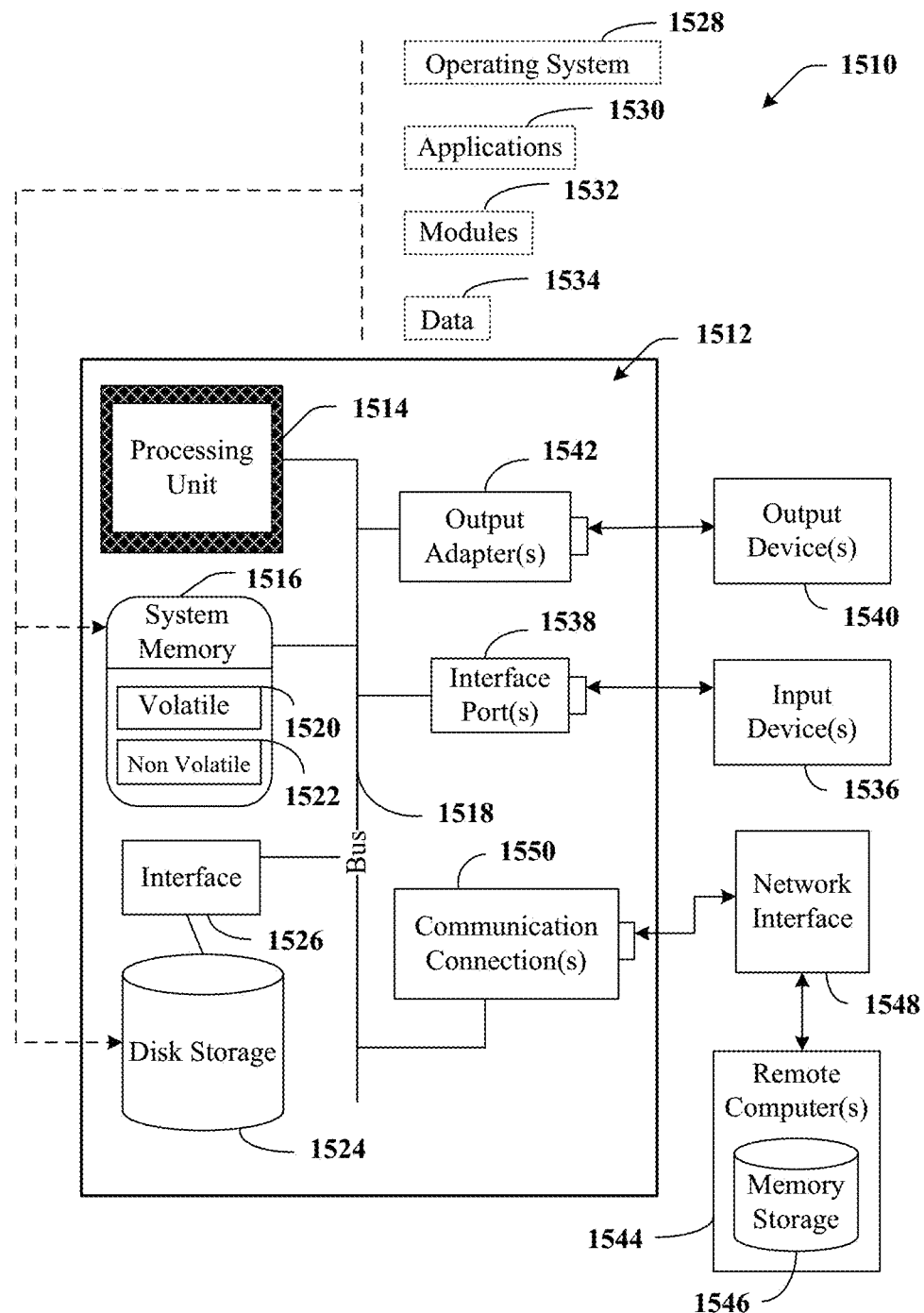
FIG. 15 is an example computing environment.

With reference to FIG. 15, a suitable environment 1510 for implementing various aspects of the claimed subject matter includes a computer 1512. The computer 1512 includes a processing unit 1514, a system memory 1516, a codec 1515, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and non-volatile memory 1522. The basic input/output system (BIOS), containing the basic routines to transfer information between elements within the computer 1512, such as during start-up, is stored in non-volatile memory 1522. By way of illustration, and not limitation, non-volatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. According to present aspects, the volatile memory may store the write operation retry logic (not shown in FIG. 15) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1512 may also include removable/non-removable, volatile/non-volatile computer storage media. FIG. 15 illustrates, for example, a disk storage 1524. Disk storage 1524 includes, but is not limited to, devices like a magnetic disk drive, solid state disk (SSD) floppy disk drive, tape drive, Zip drive, LS-110 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

It is to be appreciated that FIG. 15 describes software, software in execution, hardware, and/or software in combination with hardware that acts as an intermediary between users and the basic computer resources described in the suitable operating environment 1510. Such software includes an operating system 1528. Operating system 1528, which can be stored on disk storage 1524, acts to control and allocate resources of the computer system 1512. Applications 1530 take advantage of the management of resources by operating system 1528 through program modules 1532, and program data 1534, such as the boot/shutdown transaction table and the like, stored either in system memory 1516 or on disk storage 1524. It is to be appreciated that the claimed subject matter can be implemented with various operating systems or combinations of operating systems. For example, applications 1530 and program data 1534 can include software implementing aspects of this disclosure.

A user enters commands or information into the computer 1512 through input device(s) 1536, non-limiting examples of which can include a pointing device such as a mouse, trackball, stylus, touch pad, keyboard, microphone, joystick, game pad, satellite dish, scanner, TV tuner card, digital camera, digital video camera, electronic nose, web camera, and any other device that allows the user to interact with computer 1512. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1538. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1540 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device, a smart phone, a tablet, or other network node, and typically includes many of the elements described relative to computer 1512. For purposes of brevity, only a memory storage device 1546 is illustrated with remote computer(s) 1540. Remote computer(s) 1540 is logically connected to computer 1512 through a network interface 1548 and then connected via communication connection(s) 1550. Network interface 1548 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, wired and wireless Ethernet cards, hubs, and routers.

Figure 16:
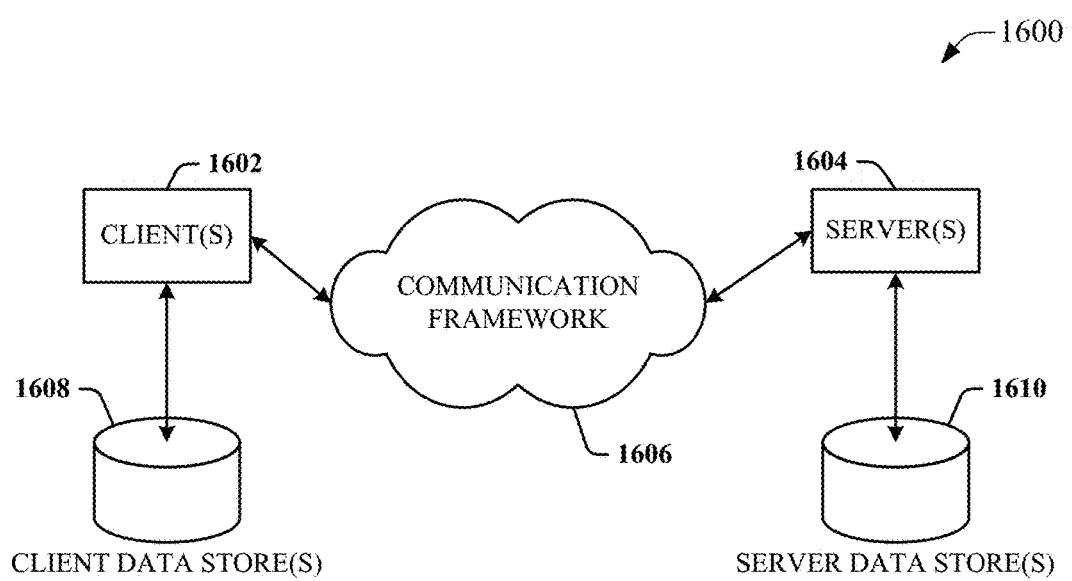
FIG. 16 is an example networking environment.

Referring now to FIG. 16, there is illustrated a schematic block diagram of a computing environment 1600 in accordance with this specification. The system 1600 includes one or more client(s) 1602, (e.g., computers, smart phones, tablets, cameras, PDA's). The client(s) 1602 can be hardware and/or software (e.g., threads, processes, computing devices). The client(s) 1602 can house cookie(s) and/or associated contextual information by employing the specification, for example.

The system 1600 also includes one or more server(s) 1604. The server(s) 1604 can also be hardware or hardware in combination with software (e.g., threads, processes, computing devices). The servers 1604 can house threads to perform transformations of media items by employing aspects of this disclosure, for example. One possible communication between a client 1602 and a server 1604 can be in the form of a data packet adapted to be transmitted between two or more computer processes wherein data packets may include coded analyzed headspaces and/or input. The data packet can include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1611 that can be employed to store information local to the servers 1604.

In one exemplary implementation, a client 1602 can transfer an encoded file, (e.g., encoded media item), to server 1604. Server 1604 can store the file, decode the file, or transmit the file to another client 1602. It is to be appreciated, that a client 1602 can also transfer uncompressed file to a server 1604 and server 1604 can compress the file and/or transform the file in accordance with this disclosure. Likewise, server 1604 can encode information and transmit the information via communication framework 1606 to one or more clients 1602.

The illustrated aspects of the disclosure may also be practiced in distributed computing environments where certain tasks are performed by remote processing devices that are linked through a communications network. In a distributed computing environment, program modules can be located in both local and remote memory storage devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a mobile device comprising a processor and having a smartphone application installed and running thereon, from a hub device communicatively coupled to a motion sensor device, information indicative of a detection of a presence of a moving object;
   in response to the receiving the information and based on a condition being determined to be satisfied, generating, by the mobile device running the smartphone application a first signal to be sent to a control server, wherein the first signal comprises the information indicative of the detection of the presence of the moving object;
   in response to the first signal being sent to the control server, receiving, by the mobile device running the smartphone application, a second signal comprising a confirmation that the first signal was received by the control server, wherein the first signal being sent to the control server enables the control server to further send an event message, based on the first signal, to a group of smartphone applications registered with the control server as authorized to receive the event message, and wherein the group of smartphone applications comprises the smartphone application; and
   in response to the receiving the second signal, generating, by the mobile device running the smartphone application, a notification of the detection via different modalities at the mobile device.

2. The method of claim 1, further comprising:
   after the receiving the information by the smartphone application from the hub device, and based on the condition being determined not to have been satisfied, rejecting, by the mobile device running the smartphone application, the information and not performing the generating of the first signal.

3. The method of claim 1, wherein the generating the notification of the detection via the different modalities comprises generating the notification when a defined time period elapses without having received, by the mobile device running the smartphone application, a response from the control server.

4. The method of claim 1, wherein the generating the notification of the detection via the different modalities comprises generating audible information at the mobile device.

5. The method of claim 1, wherein the generating the notification of the detection via the different modalities comprises generating visual information at the mobile device.

6. The method of claim 1, wherein the generating the notification of the detection via the different modalities comprises generating a third signal comprising the event message to be sent to other devices communicatively coupled to the mobile device.

7. The method of claim 1, wherein the receiving of the information comprises receiving the information via a peer to peer communication protocol that directly connects the mobile device running the smartphone application to the hub device without connecting to any intermediary device and wherein the peer to peer communication protocol is further used to facilitate communication of at least one of the first signal or the second signal.

8. A motion detection system, comprising:
   a mobile device comprising a smartphone application installed and executing thereon, a processor, and a memory that stores executable instructions that, when executed by the processor, facilitate performance of operations, comprising:
   receiving, from a hub device communicatively coupled to a motion sensor device, information indicative of a detection of a presence of a moving object;
   in response to the receiving the information and based on a condition being determined to be satisfied, generating a first signal to be sent to a control server, wherein the first signal comprises the information indicative of the detection of the moving object;
   in response to the first signal being sent to the control server, receiving a second signal comprising a confirmation that the first signal was received by the control server, wherein the first signal being sent to the control server enables the control server to further send an event message, based on the first signal, to a group of smartphone applications registered with the control server as authorized to receive the event message, and wherein the group of smartphone applications comprises the smartphone application; and
   in response to the receiving the second signal, generating a notification of the detection via different modalities at the mobile device.

9. The motion detection system of claim 8, wherein the first signal being sent to the control server further enables the control server to send an event message, based on the first signal, to a vehicle registered with the control server as authorized to receive the event message.

10. The motion detection system of claim 9, wherein the sending the event message enables the vehicle to display an alert from the group comprising at least one of a message on a display component of the vehicle or an audible message via a speaker of the vehicle.

11. The motion detection system of claim 8, wherein, in response to the receiving the information indicative of the detection, generating a third signal, comprising an alert signal, to a vehicle registered with the mobile device executing the smartphone application.

12. The motion detection system of claim 11, wherein the mobile device executing the smartphone application facilitates manipulation of a garage door communicatively coupled to the hub device.

13. The motion detection system of claim 8, wherein, in response to the receiving the information indicative of the detection of the moving object, displaying video information corresponding to a recording of the detection of the moving object captured by the motion sensor device.

14. The motion detection system of claim 8, wherein, in response to the receiving the information indicative of the detection of the moving object, rendering an audio recording corresponding to a recording of the detection of the moving object captured by the motion sensor device.

15. A non-transitory machine-readable storage medium, comprising executable instructions that, when executed by a processor of a mobile device, comprising a smartphone application instantiated thereon and that is communicatively coupled to a security system, facilitate performance of operations, comprising:
  receiving, from a hub device communicatively coupled to a motion sensor device, information indicative of a detection of a presence of a moving object;
  in response to the receiving the information and based on a condition being determined to be satisfied, generating a first signal to be sent to a control server, wherein the first signal comprises the information indicative of the detection of the presence of the moving object;
  in response to the first signal being sent to the control server, receiving a second signal comprising a confirmation that the first signal was received by the control server, wherein the first signal being sent to the control server enables the control server to further send an event message, based on the first signal, to a group of smartphone applications registered with the control server as authorized to receive the event message, and wherein the group of smartphone applications comprises the smartphone application; and
  in response to the receiving the second signal, generating a notification of the moving object via different modalities at the mobile device.

16. The non-transitory machine-readable medium of claim 15, wherein the operations further comprise:
  in response to the receiving the second signal, generating a third signal indicative of the moving object, and
  sending the third signal to a device associated with a law enforcement agency.

17. The non-transitory machine-readable medium of claim 15, wherein the first signal being sent to the control server further enables the control server to send a third signal indicative of the moving object, based on the first signal, to a device associated with a law enforcement agency.

18. The non-transitory machine-readable medium of claim 15, wherein the mobile device facilitates manipulation of a setting of the motion sensor device.

19. The non-transitory machine-readable medium of claim 15, wherein the mobile device facilitates engagement or disengagement of a door lock communicatively coupled to the hub device.

20. The non-transitory machine-readable medium of claim 15, wherein the mobile device facilitates manipulation of an illumination device communicatively coupled to the hub device.

* * * * *